US009841965B2

(12) United States Patent
Moeller et al.

(10) Patent No.: US 9,841,965 B2
(45) Date of Patent: Dec. 12, 2017

(54) CENTRALIZED SYSTEM FOR SOFTWARE UPDATING VEHICLE COMPONENTS

(71) Applicant: LEAR CORPORATION, Southfield, MI (US)

(72) Inventors: Douglas S Moeller, Santa Rosa, CA (US); Ronald W Pashby, San Francisco, CA (US); Courtney Joe Holmes, Santa Rosa, CA (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/739,469

(22) Filed: Jun. 15, 2015

(65) Prior Publication Data

US 2016/0364225 A1 Dec. 15, 2016

(51) Int. Cl.
| | |
|---|---|
| *G06F 9/44* | (2006.01) |
| *G06F 9/445* | (2006.01) |
| *G06F 17/30* | (2006.01) |
| *H04L 12/26* | (2006.01) |
| *H04L 29/08* | (2006.01) |
| *H04L 29/06* | (2006.01) |

(52) U.S. Cl.
CPC .......... *G06F 8/65* (2013.01); *G06F 17/30516* (2013.01); *H04L 43/10* (2013.01); *H04L 67/12* (2013.01); *H04L 67/34* (2013.01); *H04L 67/42* (2013.01); *G06F 8/665* (2013.01)

(58) Field of Classification Search
None
See application file for complete search history.

(56) References Cited

U.S. PATENT DOCUMENTS

| | | | | |
|---|---|---|---|---|
| 6,295,492 | B1* | 9/2001 | Lang | G05B 15/02 340/425.5 |
| 8,140,580 | B2* | 3/2012 | Rehm | G06F 11/3636 707/791 |
| 8,775,508 | B2* | 7/2014 | Rose | H04L 67/104 709/203 |
| 9,055,022 | B2* | 6/2015 | Ricci | G06F 3/0484 |

(Continued)

OTHER PUBLICATIONS

Microsoft, "Microsoft Computer Dictionary Fifty Edition" 2002 by Microsoft Press, p. 212.*

*Primary Examiner* — Evral E Bodden
(74) *Attorney, Agent, or Firm* — Donald J Lenkszus

(57) ABSTRACT

A centralized system for real-time monitoring widely distributed software updates of vehicle components, comprises: an arbitration server; a distributed network comprising a plurality of communication servers; a plurality of vehicles, each vehicle of said plurality of vehicles comprising a telematics control unit (TCU) operable to communicate with one communication server of said plurality of communication servers, each TCU is adapted to receive and deploy software updates to electronic control units (ECUs) within its corresponding vehicle, and said TCU is operable to generate status updates for software updates and communicate the status updates to the corresponding communication server; and each communication server is operable to simultaneously receive data messages comprising status updates from the plurality of vehicles and to generate a data stream comprising the data messages, the data stream being sent to a log file.

16 Claims, 23 Drawing Sheets

(56) References Cited

U.S. PATENT DOCUMENTS

| | | | | |
|---|---|---|---|---|
| 9,176,924 B2* | 11/2015 | Ricci | ............... | G06F 9/54 |
| 9,335,765 B2* | 5/2016 | Pilutti | ............... | B60W 50/14 |
| 2002/0100026 A1* | 7/2002 | Betros | ............... | G06F 8/41 |
| | | | | 717/136 |
| 2005/0256614 A1* | 11/2005 | Habermas | ............... | G06F 8/65 |
| | | | | 701/1 |
| 2009/0119657 A1* | 5/2009 | Link, II | ............... | G06F 8/65 |
| | | | | 717/171 |
| 2010/0250486 A1* | 9/2010 | Brunner | ............... | G06F 17/3089 |
| | | | | 707/603 |
| 2012/0173387 A1* | 7/2012 | Talker | ............... | G06Q 30/0641 |
| | | | | 705/27.1 |
| 2016/0117162 A1* | 4/2016 | Searle | ............... | G06F 8/65 |
| | | | | 717/173 |

* cited by examiner

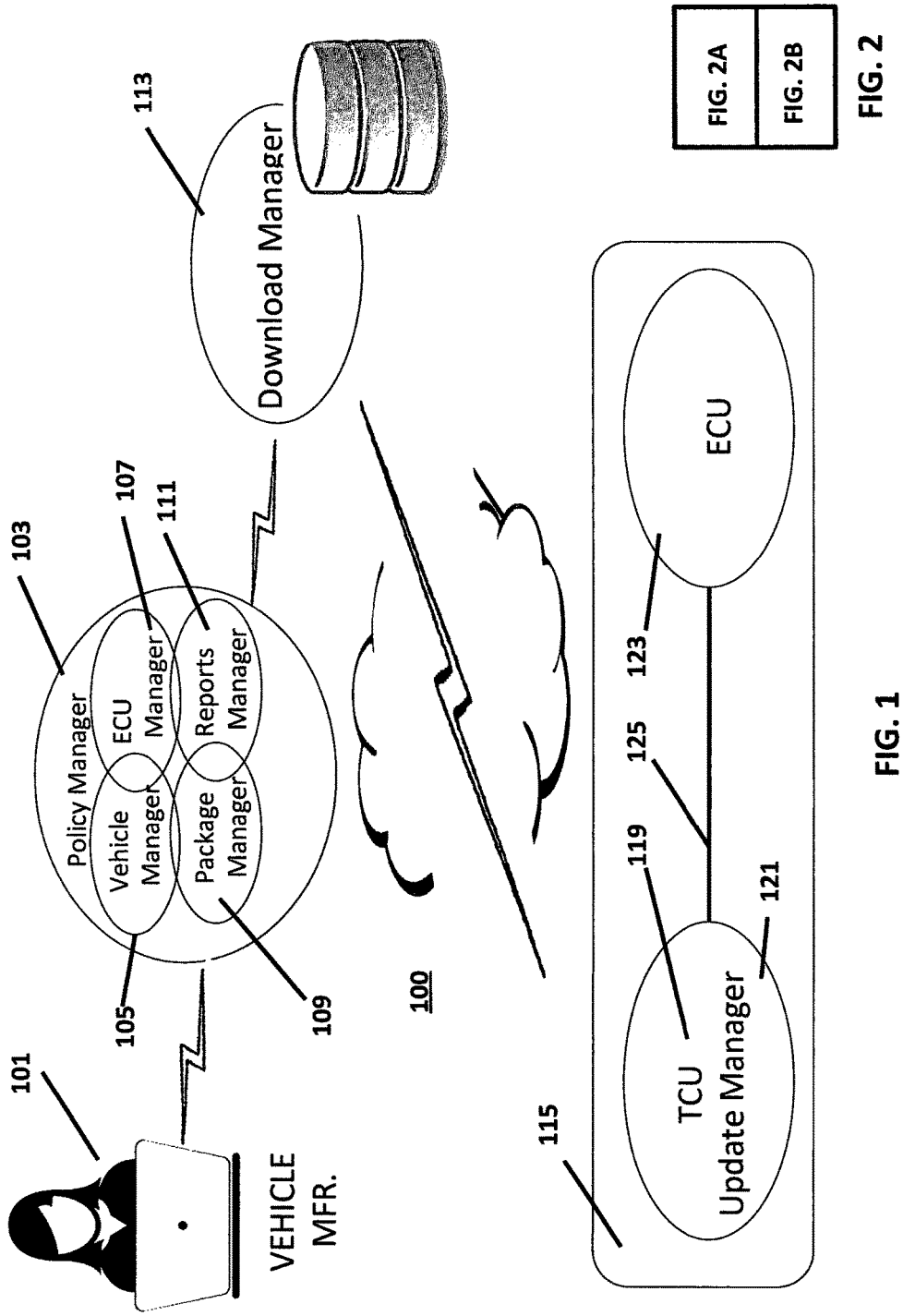

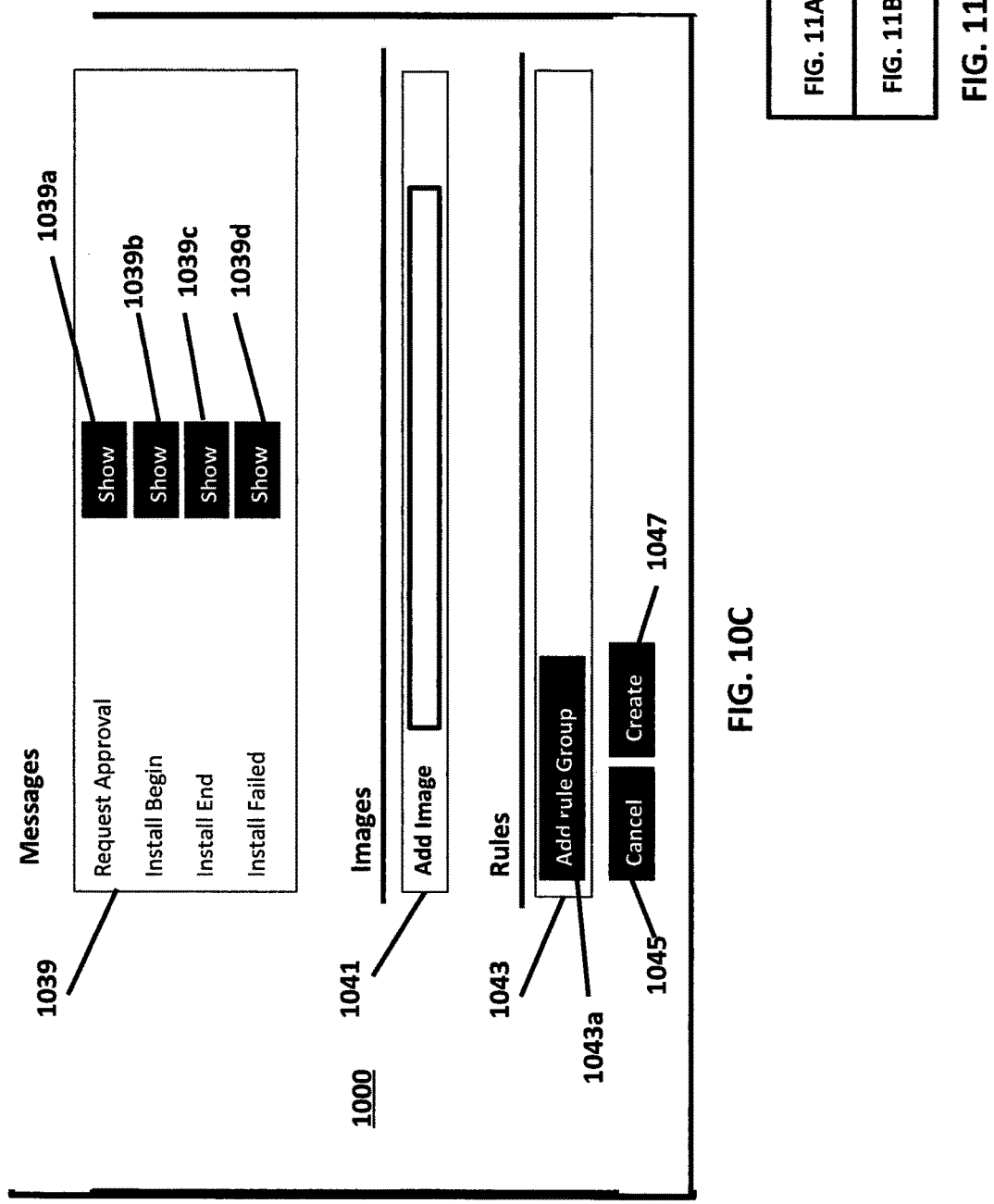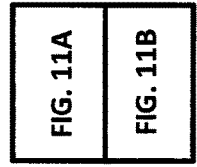

Rules

Vehicle transmission      park
ECU PartNo ANM3232-ST     is present
Match Code      0x00DE     0xFFEE

Runtime

Require dealer initiation? ☑
Allow dealer to override customer notification settings? ☐
Retry Downloads     Every 1 hour, times 1.1 per retry

Notification Rules

Require customer approval at start time? ☐
Send approval request at ignition off event? ☐
Allow customer to reschedule? ☐
Notify at start? ☐
Notify at completion? ☐

Messages

Request Approval     Show
Install Begins     Show
Install Ends     Show
Install Failed     Show

Images

| Image Name | Target ECUs | Size | ->Level |
|---|---|---|---|
| North American Maps | Multi Media Radio | 3.3M | 12001 |
| North American POI's | Multi Media Radio | 1.7M | 12002 |
| Michign Coupons | Multi Media Radio | 200K | 12003 |

*Estimated installation time: 1.2 sec*

Rules

| | | |
|---|---|---|
| Vehicle transmission | park | |
| ECU PartNo ANM3232-ST | is present | |
| Match Code | 0x00DE | 0xFFEE |

Runtime

| | |
|---|---|
| Require dealer initiation? | ☑ |
| Allow dealer to override customer notification settings? | ☑ |
| Retry Downloads | Every 15 minutes, times 2 per retry |

Notification Rules

| | |
|---|---|
| Require customer approval at start time? | ☑ |
| Send approval request at ignition off event? | ☑ |
| Allow customer to reschedule? | ☑ |
| Notify at start? | ☑ |
| Notify at completion? | ☐ |

Messages

| | |
|---|---|
| Request Approval | Show |
| Install Begin | Show |
| Install Ends | Show |
| Install Failed | Show |

CENTRALIZED SYSTEM FOR SOFTWARE UPDATING VEHICLE COMPONENTS

FIELD OF THE INVENTION

The invention relates to vehicles, in general, and to methods and apparatus permitting vehicle manufacturers to remotely update vehicle software in mass or individually utilizing over the air (OTA) wireless communication of update packages to vehicles.

BACKGROUND OF THE INVENTION

Vehicles make extensive use of programmed electronics to control a variety of apparatus and functions. Typically, electronic control units (ECUs) provide control of apparatus and functions. Each ECU typically comprises a microcontroller and a flash memory to store software and parameters for controlling the specific ECU related apparatus or functions.

The ECUs are interconnected into a vehicle network via a bus. One such vehicle network bus in common usage is a controller area network (CAN) bus that is a standardized vehicle bus designed to allow ECUs and devices to communicate with each other.

Modern vehicles also typically comprise wireless communication capabilities. One such mechanism for providing wireless communications may include a telematics control unit (TCU). Generally, a TCU refers to an embedded system on board a vehicle that combines telecommunications and information processing. The term has evolved to refer to automobile systems that combine global positioning system (GPS) satellite tracking and wireless communications. A TCU typically comprises or has access to a global positioning system (GPS) unit, which keeps track of the location of the vehicle, a memory, a microcontroller, and one or more interfaces for wireless mobile communication via, for example, GPRS, Wi-Fi, WiMAX, or LTE. A TCU is connected or coupled to the vehicle network bus.

From time to time the vehicle manufacture may issue software updates to provide enhancements or corrections or other changes to software and data stored in the various ECUs. The updates are installed by reflashing the ECU flash memories.

Typically software updates are provided under a manufacturers warranty or as part of a recall. Notices are sent out to vehicle owners requesting that the owner return the vehicle to a manufacturer's dealer for software updating. Upon bringing the vehicle into the dealer, the vehicle dealer installs the software update.

There are significant costs associated with providing vehicle updates. Manufacturers typically reimburse the vehicle dealer for installing the software. In addition there are costs associated with sending the notifications to the vehicle owners. It is not uncommon for vehicle owners to fail to respond to a notification thereby necessitating the additional expense of subsequent notifications. It is not uncommon for a vehicle owner to fail to timely respond to the inconvenience of bringing a vehicle into a dealer.

Accordingly it is desirable to provide methods and apparatus that permit remote updating of vehicle software such that dealer costs for software installation are significantly reduced or eliminated altogether.

SUMMARY

An embodiment of a method for wireless remote updating of vehicle software of one or more target electronic control units (ECUs) in a target vehicle group comprising one or more vehicles, each ECU comprising a flash memory is provided. The method comprises hosting manager software on a server that is one of a client server or a central server accessible by a client. The method further comprises utilizing the manager software for: selecting the target vehicle group; generating a differential update package (DUP) for the target vehicle group, the DUP comprising update manager software; selecting update prerequisites for executing the DUP; and selecting update scheduling for downloading the DUP. The method further comprises: providing download manager software for downloading the DUP to each one or more target vehicles, and utilizing the download manager software for: establishing a separate wireless communication link to a telematics control unit (TCU) in each target vehicle of the target vehicle group; and utilizing the download manager software to download the DUP to each TCU via each separate wireless communication link. The method further comprises utilizing the update manager in each TCU to update the one or more target ECUs in each target vehicle by utilizing the DUP to reflash each flash memory of the one or more target ECUs.

The embodiment may further comprise: providing the DUP with an update rule set and utilizing the update manager software at each TCU to update each target ECU flash memory by performing the following steps: validating each target ECU flash image downloaded to each TCU; validating the updated rule set downloaded to each TCU; and updating each target ECU in compliance with the rule set.

The embodiment may further comprise: utilizing the download manger software to provide update interaction with each TCU via the separate wireless communication link.

The embodiment may comprise operating each TCU to report update status to the download manager software via the wireless communication link.

The embodiment may comprise utilizing the manager software for: performing a vehicle search; creating and managing a plurality of vehicle groups; and selecting the target vehicle group from the plurality of vehicle groups.

The embodiment may further comprise viewing ECU hardware and software on a per vehicle basis.

The embodiment may comprise utilizing the download manger software to provide update interaction with each the TCU via the wireless communication link.

The embodiment may comprise utilizing each TCU to report status of the update to the download manager software via the wireless communication link.

The embodiment may comprise providing the manager software with an ECU manager. The method may comprise utilizing the ECU manager to search for predetermined ECUs; and utilizing the ECU manager to perform one or both of uploading contents of each flash memory of the predetermined ECUs or managing flash memory contents of the predetermined ECUs.

The embodiment may comprise utilizing the download manager software to provide update interaction with the TCU via the wireless link.

The embodiment may comprise operating the TCU to report status of the update to the download manager software via the wireless link.

The embodiment may comprise utilizing the manager software for: performing a vehicle search; creating and managing vehicle groups; and viewing ECUs on a per vehicle basis and current hardware and software versions of each viewed ECU.

The embodiment may comprise providing package manager software, utilizing the package manager to select update prerequisites; utilizing the package manager to select update scheduling; and utilizing the package manager to select notifications to be generated.

The embodiment may comprise utilizing the manager software to request approval of each DUP from one or more predetermined individuals.

The embodiment may comprise receiving approval of each DUP from one or more predetermined individuals prior to initiating any download of each the DUP.

An embodiment of a method for updating an electronic control unit (ECU) in a vehicle, the ECU comprising flash memory storing a digital content image, a random access memory (RAM), and a boot loader comprises: generating a differential update package (DUP) for the ECU to update the digital content image to an updated digital content image. The DUP comprises instructions to perform one or more of copying bytes from the flash memory, applying a set of modifications to the copied bytes, and adding additional bytes. The method further comprises transmitting the DUP over a wireless carrier system to a telematics device of the vehicle; storing an original block of the flash memory into the RAM; modifying the block in accordance with the DUP to produce a modified block; erasing the original block from the flash memory; and writing the modified block into the flash memory in place of the block.

The flash memory and the RAM are sized to not have the capacity to simultaneously store the present digital content image, the desired digital content image, and the DUP.

The method further comprises generating the DUP by comparing present digital content image of the flash memory with new desired digital content image of the flash memory and producing a set of changes required to modify the present digital content image to the desired digital content image.

The method may further comprise modifying the boot loader to allow a flashing tool to provide instructions to the boot loader to implement the DUP on the digital content image.

The method may further comprise utilizing the flashing tool to keep track of progression of updating the flash memory; utilizing the flashing tool to detect any disruption of the updating progression; and utilizing the flashing tool to initiate continuation of the updating progression from the disruption.

The method may further comprise modifying the boot loader to allow a flashing tool to provide instructions to the boot loader to implement the DUP on the digital content image.

An embodiment of a centralized system for real-time monitoring widely distributed software updates of vehicle components, comprises: an arbitration server; a distributed network comprising a plurality of communication servers; and a plurality of vehicles, each vehicle of the plurality of vehicles comprises a telematics control unit (TCU) operable to communicate with one communication server of the plurality of communication servers, the TCU adapted to receive and deploy software updates to electronic control units (ECUs) within the vehicle, and the TCU is operable to generate status updates for the software updates and communicate the status updates to the one communication server. Each communication server of the plurality of communication servers is operable to simultaneously receive the data messages comprising status updates from the plurality of vehicles and to generate a data stream comprising the data messages from the plurality of vehicles, the data stream being sent to a log file.

In the embodiment, the log file is dedicated to a client; and the arbitration server receives filtering terms and parameters from the client to reduce the data stream to client determined data.

The embodiment may operate such that the arbitration server receives parameters from the client to control at least one of formatting and presentation of the data stream.

Still further, the arbitration server communicates the filter terms to selected communication servers of the plurality of communication servers for which the filtering terms apply.

Each communication server may compare each of the data messages to the filtering terms to determine whether each data message matches the filtering terms and to produce a filtered data stream. The filtered data stream is communicated to the arbitration server.

Another embodiment of a centralized system for real-time monitoring widely distributed software updates of vehicle components, comprises a client server, an arbitration server, and a distributed network comprising a plurality of communication servers. Each server is operable to communicate with a corresponding plurality of vehicles. Each vehicle of the corresponding plurality of vehicles comprises apparatus operable to communicate with a corresponding communication server of the plurality of communication servers. The apparatus is operable to communicate with electronic control units (ECUs) in each vehicle. The apparatus is operable to receive software updates from the communication server and to selectively deploy the software updates to one or more ECUs within the vehicle. The apparatus is operable to monitor status of the software updates and to generate status updates for deployment of the software updates. The apparatus is operable to communicate the status updates to the corresponding communication server. Each corresponding communication server is operable to receive data messages comprising status updates from the corresponding plurality of vehicles and is operable to utilize the data messages from the corresponding plurality of vehicles to generate a data stream.

In this embodiment, the arbitration server receives filtering terms from the client server and applies the filtering terms to the data stream to reduce the data stream to client determined data. The arbitration server may receive formatting parameters from the client server to control formatting of the data stream. The arbitration server communicates the filter terms to selected communication servers of the plurality of communication servers for which the filtering terms apply. Each communication server applies the filtering terms to each of the data messages to produce a filtered data stream, and the filtered data stream is communicated to the arbitration server. The arbitration server combines all data streams received from the plurality of communication servers for the client to produce a combined data stream, and the arbitration server applies the filtering and the formatting and presentation parameters to the combined data stream to produce a filtered data stream.

An embodiment of a method for real-time widespread distribution of software updates of vehicle components comprising flash memory comprises providing a client server for originating the software updates, providing an arbitration server operable to communicate with the client server, and providing a distributed network comprising a plurality of communication servers, each of the communication servers operable to communicate with apparatus in a plurality of corresponding vehicles. The embodiment further comprises operating each apparatus to communicate via a wireless network with one communication server of the plurality of communication servers to receive and deploy software updates to electronic control units (ECUs) within its the corresponding vehicle. The embodiment further comprises operating each apparatus to generate status updates for the software updates and to communicate the status updates to the one communication server via the wireless network. The method also comprises operating each communication server of the plurality of communication servers to be operable to concurrently receive the data messages comprising status updates from the plurality of corresponding vehicles. Still further, the method comprises operating each communication server to generate a data stream comprising the data messages from the plurality of corresponding vehicles, the data stream being sent to the arbitration server.

An embodiment of a method for real-time monitoring widely distributed software updates of vehicle components, comprises providing a client server, providing an arbitration server, providing a distributed network comprising a plurality of communication servers, and operating each communication server to communicate with a corresponding plurality of vehicles. Each vehicle of the corresponding plurality of vehicles comprises apparatus operable to communicate with a corresponding communication server of the plurality of communication servers via a wireless network and operable to communicate with electronic control units (ECUs) in each vehicle. The method comprises operating each communication server to download selected software updates for one or more predetermined ECUs in each of the plurality of vehicles to each vehicle apparatus via the wireless network, operating each vehicle apparatus to selectively deploy the software updates to the one or more predetermined ECUs within the vehicle to monitor status of the software updates and to generate status updates for deployment of the software updates, and operating each vehicle apparatus to communicate the status updates to the corresponding communication server via the wireless network. Each corresponding communication server is operable to receive data messages comprising status updates from each vehicle apparatus and to utilize the data messages from the corresponding plurality of vehicles to generate a corresponding data stream.

An embodiment of a method for real-time distribution of software updates of vehicle components comprising flash memory comprises the steps of determining that a vehicle owner has requested a software update for the owner's vehicle; providing a client server for originating the software update; providing an arbitration server operable to communicate with the client server; providing a distributed network comprising a plurality of communication servers, each of the communication servers operable to communicate with apparatus in a plurality of corresponding vehicles via a wireless network. The method further comprises operating each apparatus in the owner's vehicle to communicate with one communication server of the plurality of communication servers via the wireless network to receive and deploy the software updates to an electronic control units (ECU) within the owner's vehicle; operating the apparatus in the owner's vehicle to generate status updates for the software update and to communicate the status update to the one communication server via the wireless network; operating each communication server of the plurality of communication servers operable to concurrently receive data messages comprising status updates from the plurality of corresponding vehicles via the wireless network; and operating each communication server to generate a data stream comprising the data messages from the plurality of corresponding vehicles and the status update from the owner's vehicle. The data stream is sent to the arbitration server via the wireless network.

An embodiment of a method for real-time monitoring widely distributed software updates of vehicle components comprises providing a distributed network comprising a plurality of communication servers; and operating each communication server to communicate with a corresponding plurality of vehicles. Each vehicle comprises apparatus operable to communicate with a corresponding communication server of the plurality of communication servers over a wireless network. The apparatus is operable to communicate with electronic control units (ECUs) in each vehicle. The method further comprise initiating a software update to apparatus in a predetermined one vehicle of the plurality of vehicles; operating one of the communication servers to download selected software updates for a predetermined one or more ECUs in the predetermined one vehicle; and operating each predetermined one vehicle apparatus to selectively deploy the software updates to one or more predetermined ECUs within the predetermined one vehicle, to monitor status of the software updates and to generate status updates for deployment of the software updates; operating the apparatus to communicate the status updates to the corresponding communication server. The one communication server is operable to receive data messages comprising the status updates from the predetermined one vehicle apparatus and to utilize the data messages to generate a corresponding data stream.

An embodiment of a telematics control unit (TCU) installable in a vehicle comprises a wireless network interface; an interface to a vehicle bus coupled to a plurality of electronic control units (ECUs) disposed in the vehicle, each ECU comprising flash memory, a random access memory (RAM), and a boot loader; a memory; a processor; and a differential update package (DUP) received via the wireless network interface to provide an update to a specific one ECU of the ECUs, the DUP comprising a flashing tool, differential update instructions for the specific one ECU and differential update data for the flash memory of the specific one ECU. The processor utilizes the flashing tool to provide the differential update instructions to the boot loader of the specific one ECU. The differential update instructions cause are executable by the specific one ECU to store a block of the flash memory into the RAM; the processor is operable to provide the differential update data to the specific one ECU; the differential update instructions are executable by the specific one ECU to modify the block in accordance with the differential update data to produce a modified block; the differential update instructions are executable by the specific one ECU to erase the block from the flash memory; and the differential update instructions are executable by the specific one ECU to write the modified block from the RAM into the flash memory in place of the erased block.

The processor utilizes the flashing tool to keep a progression state of the update to the flash memory. The processor utilizes the progression state to detect any disruption of the update. The processor utilizes the flashing tool to initiate continuation of the update subsequent to the disruption.

The wireless network interface may comprise an interface to a wireless wide area network. The wireless network interface may comprise an interface to a wireless local area network.

The TCU may comprise a communications agent to automatically select one of the wireless wide area network interface and the wireless local area network interface over which to receive the DUP.

The TCU may comprise a communications agent responsive to an attempt to download the DUP over one of the wireless wide area network interface and the wireless local area network interface to automatically enable downloading the DUP to the telematics control unit.

Another embodiment of a telematics control unit (TCU) installable in a vehicle comprises: a wireless network interface; an interface to a vehicle bus coupled to a plurality of electronic control units (ECUs) disposed in the vehicle, each ECU comprising flash memory, a random access memory (RAM), and a boot loader; a memory; a processor; and a differential update package (DUP) received via the wireless network interface to provide an update to a specific one ECU of the ECUs, the DUP comprises a flashing tool, differential update instructions for the specific one ECU and differential update data for the flash memory of the specific one ECU. The processor is operable to determine if the vehicle is in a predetermined state and the processor is operable to update the ECU if the vehicle is in the predetermined state.

The processor is operable to monitor the ECU and the vehicle state and to execute the update only while the ECU is in a predetermined ECU state and the vehicle is in the predetermined state.

The processor utilizes the flashing tool to provide the differential update instructions to the boot loader of the specific one ECU. The differential update instructions are executable by the specific one ECU to store a block of the flash memory into the RAM. The processor is operable to provide the differential update data to the specific one ECU. The differential update instructions are executable by the specific one ECU to modify the block in accordance with the differential update data to produce a modified block. The differential update instructions are executable by the specific one ECU to erase the block from the flash memory and the differential update instructions are executable by the specific one ECU to write the modified block from the RAM into the flash memory in place of the erased block.

The processor is operable to monitor the ECU and the vehicle state and to execute the update only while the specific one ECU is in a predetermined ECU state and the vehicle is in the predetermined state and the updates can be completed in a predetermined period of time.

In an embodiment, the processor utilizes the flashing tool to provide differential update instructions to the boot loader of the specific one ECU. The differential update instructions are executable by the specific one ECU to store a block of the flash memory into the RAM. The processor is operable to provide differential update data to the specific one ECU. The differential update instructions are executable by the specific one ECU to modify the block in accordance with the differential update data to produce a modified block. The differential update instructions are executable by the specific one ECU to erase the block from the flash memory and the differential update instructions are executable by the specific one ECU to write the modified block from the RAM into the flash memory in place of the erased block.

In an embodiment, the processor utilizes the flashing tool to keep a progression state of the update to the flash memory. The processor utilizes the progression state to detect any disruption of the update. The processor utilizes the flashing tool to initiate continuation of the update subsequent to the disruption.

In an embodiment, the wireless network interface comprises an interface to a wireless wide area network. The wireless network interface comprises an interface to a wireless local area network. The telematics control unit may further comprise a communications agent to automatically select one of the wireless wide area network interface and the wireless local area network interface over which to receive the DUP.

In an embodiment, the communications agent is responsive to an attempt to download the DUP over one of the wireless wide area network interface and the wireless local area network interface to automatically enable downloading the DUP to the telematics control unit.

An embodiment of a method for upgrading vehicle electronic control units (ECUs) comprising a flash memory and disposed in a vehicle comprising a telematics control unit (TCU) that is operable to communicate to the ECUs is provided. The method comprises creating a differential upgrade package (DUP) for each upgrade to a predetermined ECU. The creating comprises: comparing a new image of the digital contents of the predetermined ECU flash memory with a present image of the digital contents of the predetermined ECU flash memory; and producing a set of changes to modify the present image to the new image, the changes comprising a set of instructions. The set of instructions comprises an instruction to copy a block of bytes from the predetermined ECU flash memory, an instruction perform one or more of applying a set of modifications to the block of bytes and adding additional bytes to the block of bytes to generate a block of the new image, and an instruction to copy the block of the new image into the predetermined ECU flash memory in place of the copied block of bytes from the predetermined ECU flash memory. The method further comprises downloading the DUP to one or more vehicles comprising a telematics control unit (TCU) via a wireless network and utilizing the telematics control unit to automatically respond to receipt of the DUP to the predetermined ECU to update the predetermined ECU flash memory.

In an embodiment, the method comprises utilizing a distributed network to download the DUP to a plurality of vehicles to provide concurrent updating of the predetermined ECU in each plurality of vehicles.

In an embodiment, the method comprises providing a client server; uploading the DUP to the client server; and coupling the client server to a distributed network to download the DUP to a plurality of vehicles, each comprising the predetermined ECU.

An embodiment of the method further comprises utilizing an arbitration server coupled to a plurality of communication servers for the distributed network.

The method may further comprise providing a distributed network comprising an arbitration server and a plurality of communication servers; uploading the DUP to the communication servers via the arbitration server; and downloading the DUP concurrently from the plurality of communication servers to a plurality of vehicles.

A further embodiment of a method is provided for real-time monitoring of widely distributed software updates of vehicle electronic control units (ECUs), each ECU comprising a flash memory, each ECU disposed in one vehicle of a plurality of vehicles, and each vehicle comprising a telematics control unit (TCU) that is operable to communicate to the ECUs. The method comprises creating a digital upgrade package (DUP) for each upgrade to a predetermined ECU in each vehicle of the plurality of vehicles. The creating comprises: comparing a new image of the digital contents of a predetermined ECU flash memory with a present image of the digital contents of the predetermined ECU flash memory; and producing a set of changes to modify the present image to the new image, the changes comprising a set of instructions. The set of instructions comprises an instruction to copy a block of bytes from the predetermined ECU flash memory, an instruction perform one or more of applying a set of modifications to the block of bytes and adding additional bytes to the block of bytes to generate a block of the new image, and an instruction to copy the block of the new image into the predetermined ECU flash memory in place of the copied block of bytes from the predetermined ECU flash memory. The method further comprises downloading the DUP to the plurality of vehicles via a wireless distributed network; utilizing each telematics control unit to automatically respond to receipt of the DUP to update a corresponding the predetermined ECU flash memory; utilizing each telematics control unit to automatically generate an update status report for the DUP update of the corresponding predetermined ECU flash memory; and operating each telematics control unit to automatically upload the status report to the wireless distributed network.

An embodiment may comprise: providing the wireless distributed network with a plurality of communication servers, each of the communication servers operable to communicate with a corresponding subset of the plurality of vehicles; and providing the wireless distributed network with an arbitration server operable to communicate with the plurality of communication servers.

An embodiment may comprise operating each communication server of the plurality of communication servers to receive the update status report from each vehicle of the corresponding subset of the plurality of vehicles; and operating each communication server of the plurality of communication servers to combine the update status reports into a corresponding data stream.

An embodiment may comprise providing each communication server of the plurality of communication servers with data stream filtering criteria to filter the update status reports to produce a filtered data stream.

An embodiment may comprise uploading the data stream filtering criteria to the arbitration server from a client and may further comprise providing each communication server of the plurality of communication servers with formatting data to format the filtered data stream.

An embodiment may yet further comprise uploading the data stream filtering criteria to the arbitration server from a client.

An embodiment may comprise providing the arbitration server with data stream filtering criteria to filter the update status reports to produce a filtered data stream; establishing communication links with selected communication servers of the plurality of communication servers for which the data stream filtering is applicable; uploading the data stream filtering criteria to the selected communication servers; and utilizing the data stream filtering criteria at each of the selected communication servers to filter the update status reports to generate a corresponding data stream for each of the selected communication servers.

An embodiment may further comprise downloading each corresponding data stream to the arbitration server; and operating the arbitration server to combine all of the corresponding filtered data streams into a single data stream; and downloading the single data stream to the client.

An embodiment may comprise providing the arbitration server with formatting criteria; and utilizing the arbitration server to apply the formatting criteria to the single data stream to provide a formatted data stream.

An embodiment may comprise downloading the formatted data stream to the client.

An embodiment is provided for a method for real-time monitoring of widely distributed software updates of vehicle electronic control units (ECUs), each ECU comprising a flash memory, each ECU disposed in one vehicle of a plurality of vehicles, each vehicle comprising a telematics control unit (TCU) that is operable to communicate to the ECUs. The method comprises creating a digital upgrade package (DUP) for each upgrade to a predetermined ECU in each vehicle of the plurality of vehicles; downloading the DUP to the plurality of vehicles via a wireless distributed network; utilizing each telematics control unit to automatically respond to receipt of the DUP to update a corresponding the predetermined ECU flash memory; utilizing each telematics control unit to automatically generate an update status report for each DUP update of the corresponding the predetermined ECU flash memory; and operating each telematics control unit to automatically upload the status report to the wireless distributed network.

An embodiment may comprise providing the wireless distributed network with a plurality of communication servers, each of the communication servers operable to communicate with a corresponding subset plurality of vehicles of the plurality of vehicles; and providing the wireless distributed network with an arbitration server operable to communicate with the plurality of communication servers.

BRIEF DESCRIPTION OF THE DRAWING

The invention will be better understood from a reading of the following detailed description in conjunction with the drawing figures in which like designators are utilized to identify like elements, and in which:

FIG. 1 illustrates a functional overview of a system for providing vehicle updates;

FIG. 2 illustrates how

FIGS. 2A and 2B, when arranged as shown in FIG. 2, is a screenshot of a Policy Manager dashboard;

FIGS. 10A, 10B, and 10C, when arranged as shown in FIG. 10, is a screen shot of the Package Manager;

FIG. 11 illustrates how FIGS. 11A and 11B are arranged to show a second screen shot of a second screen of the Package Manager;

FIGS. 11A and 11B, when arranged as shown in FIG. 11, is a second screen shot of a second screen of the Package Manager;

FIG. 13 illustrates how FIGS. 13A and 13B are arranged to show a screen shot;

FIGS. 13A and 13B when arranged as shown in FIG. 13 illustrate a screen shot;

DETAILED DESCRIPTION

Figure 2A:
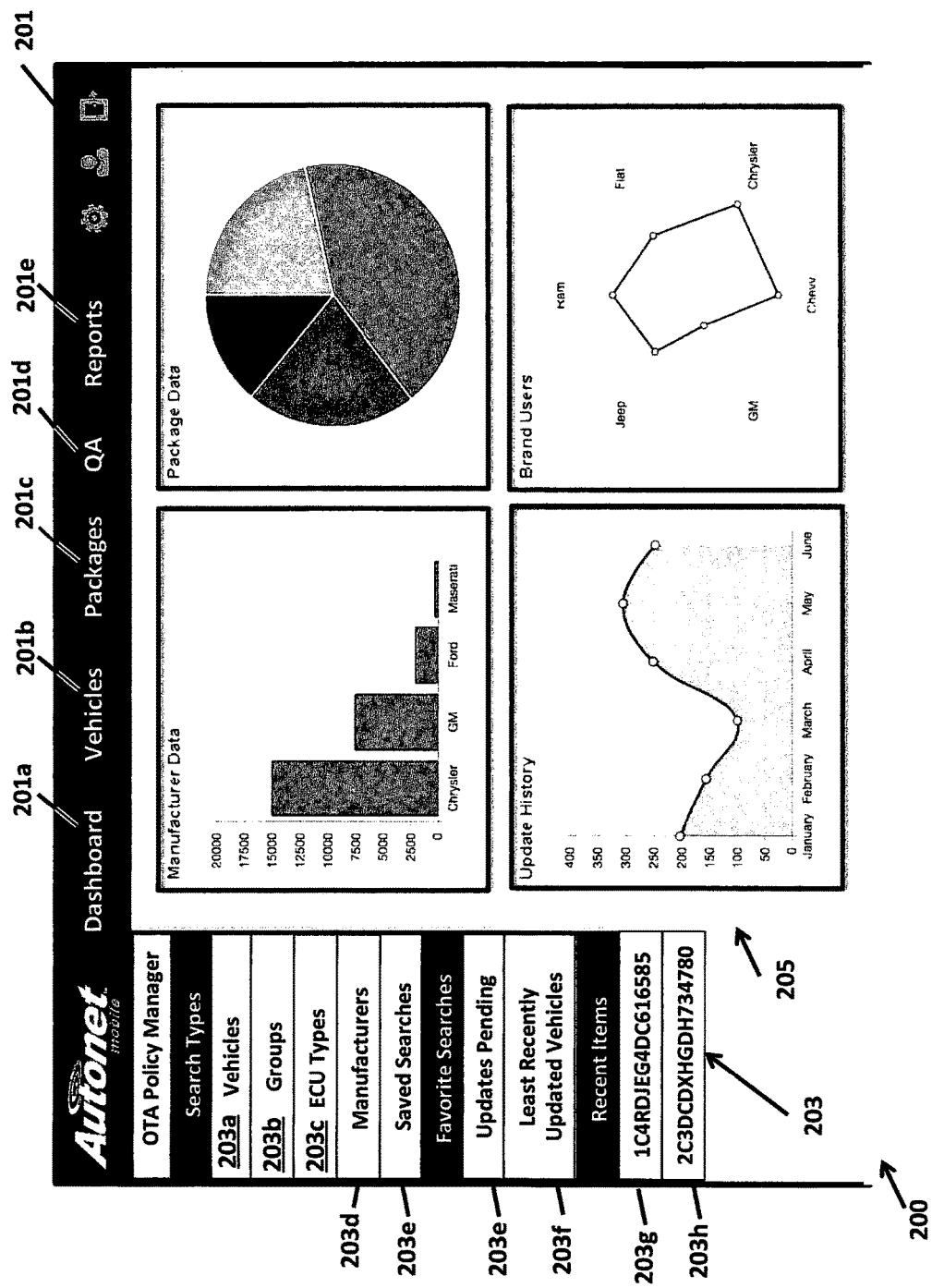
FIGS. 2A and 2B are to be arranged to show a screenshot of a Policy Manager dashboard.

FIG. 1 illustrates, in simplified form, the functionality of an embodiment of a system 100 for providing software updates to vehicles. System 100 provides for wireless distribution of vehicle software updates originating at the vehicle manufacturer including, but not limited to, enhancements or corrections or other changes to vehicular software and data. Advantageously, system 100 is operable to automatically provide such updates to individual selected vehicles or to large groups of predetermined vehicles. System 100 may be utilized to automatically provide notifications of update availability to vehicle owners, automatically download vehicle updates and to generate reports on update status.

In system 100, a software update is generated by or at the vehicle manufacturer.

To provide software updates to ECUs a method is provided to perform a differential image upgrade to vehicle ECUs having limited flash memory storage and limited random access memory (RAM), without requiring access to the original flash memory data storage image.

To reduce image download time and cost of OTA flashing of ECU images, only changes to the original image are sent instead of an entire new image. These changes are referred to herein as a Differential Upgrade Package (DUP). A DUP is created by comparing the new image to the original image and producing a set of changes required to modify the original image to the new image. The set of changes comprise instructions to copy bytes from the original image and apply a set of modifications to those bytes and/or add additional bytes to the new image.

One approach to create the new image requires enough memory to hold the original image, the new image and the DUP. It also requires access to the original image. However, many ECUs do not have enough flash memory and/or RAM to hold the original image, the new image and the DUP. Due to security concerns most ECUs image cannot be read externally. This presents barriers to flashing tools to implement Over-The-Air upgrading of ECUs using DUPs.

In the various embodiments a method is provided that requires only minor changes to the boot loader on the ECU to allow a flashing tool to provide instructions to boot loader to implement the DUP on the actual image in the ECU's flash memory. Flash memory is designed in such a way that for writes to occur the an area of the memory, called a block is first erased and the that block can be written. In order for a some part of a block to be modified the following sequence is typically used:

1) The block is typically read into RAM;
2) The RAM is then modified to reflect that value to be written;
3) The block is erased; and
4) The block is then written from RAM.

The ECU boot loader supports the following commands:
1) move source_address, destination_address, size
2) move_with_modifications source_address, destination_address, size, modification_bytes . . .
3) write_bytes address, size, bytes . . .

The flashing tool implementing this method takes the DUP and creates and executes the boot loader commands to perform the changes. The flashing tool also keeps a progression state, in case there is a disruption in the flashing progress.

A manufacturer representative utilizing a terminal 101 accesses a Policy Manager computer program 103. In this embodiment, Policy manager program 103 is hosted on one or more servers. The servers may be based at the vehicle manufacturer. Alternatively, Policy Manager 103 may be provided as Software as a Service (SAAS) SAAS is a software licensing and delivery model in which software is licensed on a subscription basis and is centrally hosted. SAAS is sometimes referred to as "on-demand software". SAAS is typically accessed by users via a web browser. Still further, Policy Manager 103 may be hosted on third party servers and executable thereon.

Associated with Policy Manager 103 are replicated databases that are not shown in FIG. 1. Policy Manager 103 provides customized dashboards viewable at terminal 101. The customized dashboards are described herein below.

In the embodiment shown, Policy Manager 103 comprises four distinct interlocking software components, i.e., a vehicle manager 105, ECU manager 107, package manager 109, and reports manager 111. Each of the four components is described in detail below.

Policy Manager 103 is utilized to create update packages and to obtain approval of update packages. The approved update packages are provided to a Download Manger 105 that is utilized to download the update packages to individual vehicle TCUs.

Policy Manager 103 is utilized to generate control information for the updates including a vehicle, vehicle models, and or groups of vehicles that is to be updated. In addition Policy Manger 103 identifies the corresponding ECUs and ECU flash memory data images to be updated. Policy Manager 103 is also used to determine prerequisites to each update, update scheduling and notifications to be provided. Policy Manager 103 is additionally utilized to select update status reports to be provided back to the vehicle manufacturer.

For all updates, each vehicle's ECUs must be in the correct conditions in order for flashing of the ECU memories to begin effectively. For some ECUs, this would require the vehicle have the ignition on Certain ECUs cannot be woke up unless there is an ignition on event. However, other ECUs may be woke up by a diagnostic message and flashed in while the ignition is off mode. If an ECU can be woke up in the ignition off mode, then the ECU should be able to be flashed but some of the items which need to be accounted for are power consumption, i.e., it is not desirable to draw down the vehicle battery, and the time it takes to perform the update In performing an update of an ECU, all ECU internal conditions are met for reflashing to begin. In addition, the ECU should have its flash loader in protected memory. The ECU should verify if valid code is in its flash memory (the re-flashable code) and the ECU should remain in failsafe bootblock, i.e., flashing, mode if valid code is not in flash memory. Still further the bootblock (flashing) mode should support a method of recovering from a failed flash attempt. The ECU should retain the original part number after reflash.

Download Manager 113 downloads and authenticates software package updates to each designated vehicle 115. Download manager 113 is provided on one or more servers as described herein below and provides the update packages to client or target TCUs 119 in each target vehicle 115 being updated. The update downloads are provided via a network 117 using a wireless link, i.e., over the air (OTA). A portion of the update package comprises an Update Manager 121 that TCU 119 utilizes to update one or more ECUs 123 via CAN bus 211 of vehicle 115.

Download Manager 113, in another embodiment, utilizes an Open Mobile Alliance (OMA) device management (DM) protocol to provide software update packages to target vehicles identified by the Policy Manager 103. OMA DM protocol has been utilized in the past to provide software updates to mobile devices such as mobile phones, personal digital assistants (PDAs), and tablet computers, but has not found utility for software updating vehicles. We have determined that OMA DM protocol and its management capabilities may advantageously be utilized to provide vehicle software updating.

OMA DM provides device management by wireless communication between a server that is managing a device and a client that is the device being managed. OMA DM is designed to support and utilize any number of data transports both physically over both wireline, for example universal serial bus (USB) and RS-232, and over wireless media such as, for example, GSM, CDMA, IrDA, or Bluetooth.

OMA DM communication protocol is a request-response protocol. Authentication and challenge of authentication are built-in to ensure that the server and the client are communicating only after proper validation. The server and client are both stateful, meaning a specific sequence of messages is to be exchanged only after authentication is completed to perform any task.

In an embodiment utilizing OMA DM protocol, Download Manager 105 downloads each update package to a selected target vehicle TCU. The TCU, in effect, is operated as the client of the Download Manager 105 server. In this embodiment, the OMA DM download for each DUP is defined by an OMA specification for Software Component Management Object (SCOMO) that allows a management authority to perform software management on a remote device, including installation, uninstallation, activation and deactivation of software components OTA.

The update package downloaded to each vehicle 115 TCU 119 includes an Update Manager 121 that TCU 119 executes to validate an update flash memory image, validate an update rule set, monitor each ECU 123 being updated, initiate each update, and report update status to Download Manager 105.

Vehicle Manager 105 includes the ability for a vehicle manufacturer to perform a vehicle search based on the vehicle identification number (VIN) for a particular vehicle, to perform a search for a particular ECU in a vehicle, and to perform a search for vehicle by make, model and year.

A first embodiment leverages existing technology to deliver update files to TCU. In this embodiment, each vehicle TCU is used as a diagnostic tool and updates the ECU (push). Each TCU acts as a server and supports ECU pull updates. All updates are performed at an ignition off cycle. The TCU monitors the state of its associated ECU being updated and other vehicle systems to ensure that an update is safe. If the update is to be performed without customer opt-in to the update, only updates that can be completed in a predetermined time will be allowed. The customer may schedule larger updates via communication via a website or by phone.

In certain embodiments, a customer takes the vehicle to a vehicle dealership. The dealership requests the update and prepares the vehicle. The update is performed wirelessly utilizing an OTA process. By utilizing OTA, the update is performed much quicker and multiple updates can be performed at once, saving time and money. The dealer verifies that that the updates are installed and operable.

In other embodiments, the vehicle customer is alerted about the update via email or text message, and is provided a telephone number to call to initiate an update. The telephone number may be that of a call center, customer support, or dealership and upon calling the telephone number, the customer will be provided information on how to leave the vehicle and initiate the update. Alternatively, the customer may be alerted about an update via email and/or text message, and the customer must positively reply to initiate an update. The customer is sent start/complete/status messages via email and/or text message. In these embodiments, the customer can schedule or reschedule updating via a website or by contacting the vehicle dealer. Larger sized updates may still require a dealer visit and the dealer would confirm with the customer that the vehicle is operating properly.

In yet other embodiments of the invention the vehicle manufacturer pushes updates to directly to each vehicle and each update is performed according to the rules of the policy manager. The vehicle manufacturer can optionally notify customer and/or dealership of success.

Figure 2B:
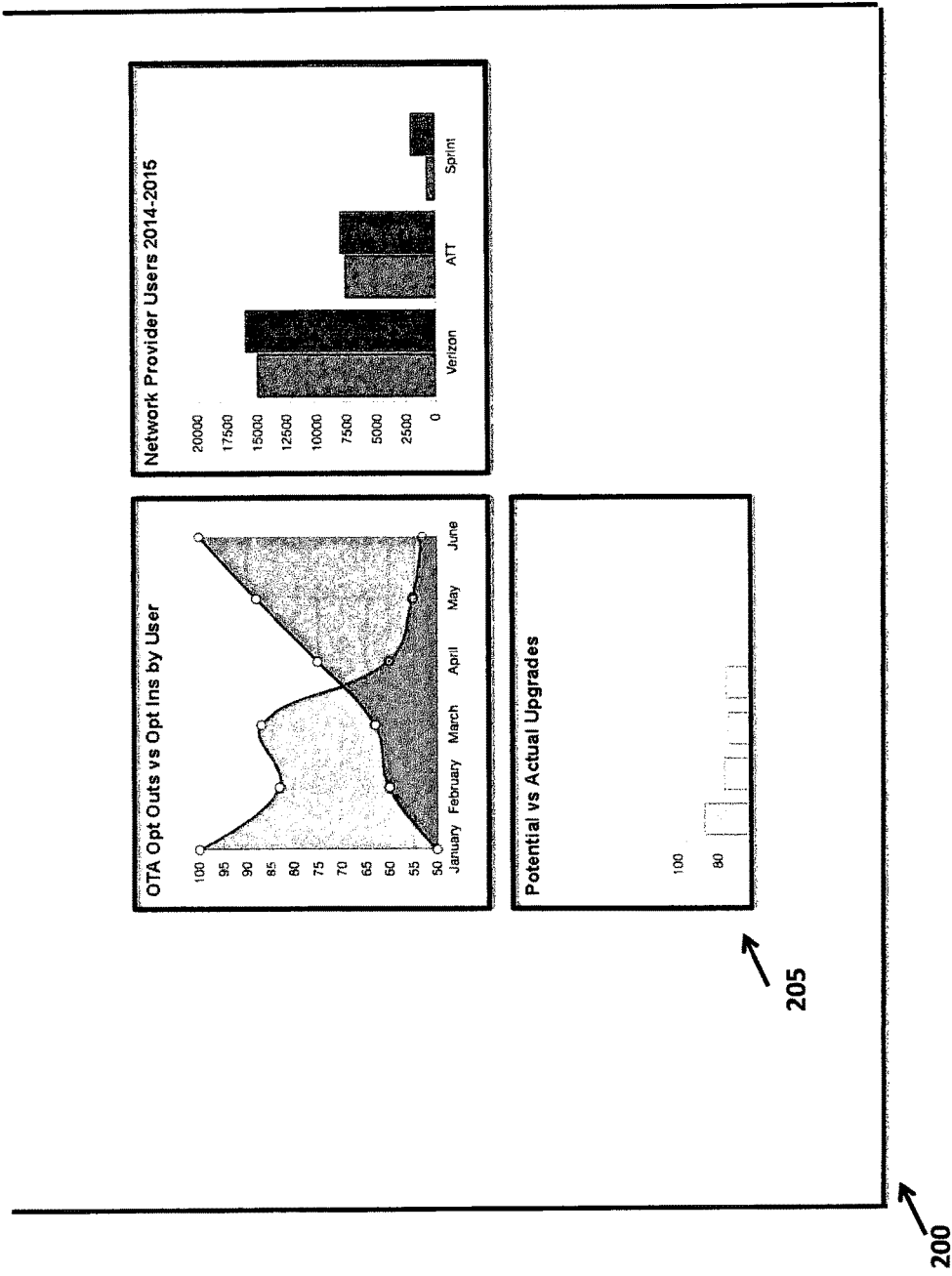

Upon logging into Policy Manager 103, a user at terminal 101 is presented with a screen 200 shown in FIG. 2. Each screen 200 for Policy Manager 103 comprises toolbars 201, 203.

Utilizing toolbar 201, a user may click on tabs or buttons to select to display a dashboard interface by clicking on Dashboard button 201a, access Vehicle Manager and ECU Manager 107 by clicking on Vehicles button 201b, access Package Manager 109 by clicking on Packages button 201c, access quality assurance reports by clicking on QA button 301d, and access Report Manager by clicking on reports button 201e.

Toolbar 203 permits a user to access additional displays. The selection of displays varies depending upon whether the screen being displayed is for Vehicle Manager 105, ECU Manager 107, Package Manager 109, QA, or Package Manager 109 comprises selection searches that are dependent on the selection made from toolbar 203.

Screen display 200 is a display for Vehicle Manager 105 and toolbar 203 provides buttons for determining a search type, favorite searches and recently viewed items related to Vehicle Manager 105. A user may select a search type by clicking on Vehicles button 203a, Groups button 203b, ECU Types button 203c, Manufactures button 203d, and Saved Searches button 203e. In addition, toolbar 203 may be utilized to display "Favorite Searches" that includes pending updates by clicking Updates Pending button 203f and Least Recently Updated Vehicles button 203g. A user may also select to view recent items by clicking on buttons 203h, 203i.

In the embodiment shown, the initial screen 200 that is presented displays a dashboard 205. Dashboard 205 presents history data in a graphical format. As shown in the embodiment, dashboard 205 shows manufacturer data, a pie chart of package data, a graph of update history, and a chart of brand users of system 100. In other embodiments different dashboard information may be presented to the user.

Figure 3:
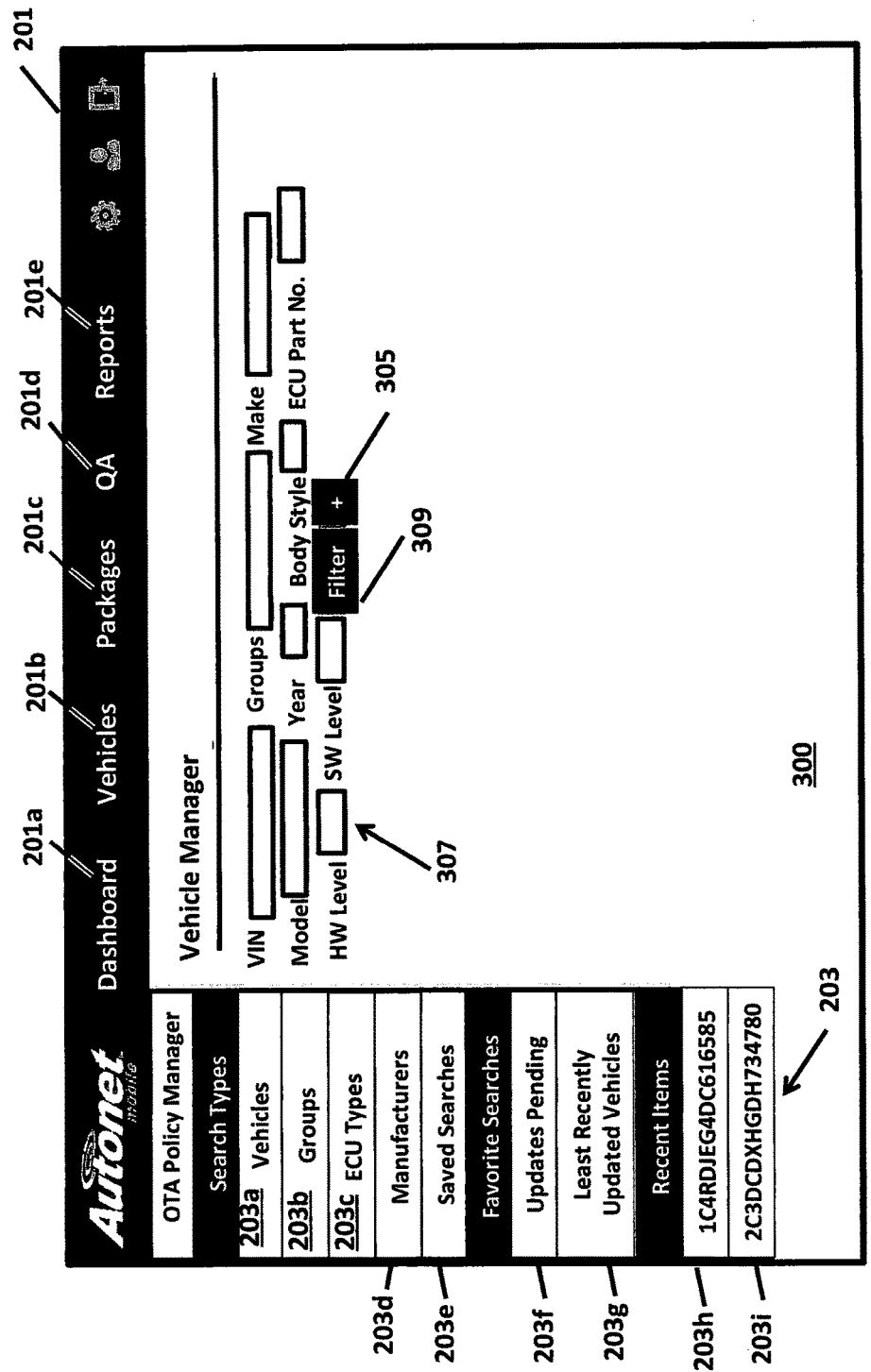
FIG. 3 is a screen shot of a Vehicle Manager vehicle selection.

Turning now to FIG. 3, assuming that the user clicks Vehicles button 201a in toolbar 201, screen 300 is displayed. Toolbar 203 provides the user with search options. Screen display 300 provides access to Vehicle Manager 105 and is used to perform vehicle searches. Clicking on + button 305 opens up search fields 307 that include vehicle VIN (vehicle identification number), Groups (for previously selected target groups), vehicle Make, Model, Year, Body Style, ECU Part Number, hardware (HW) level, and software (SW) level. By typing in the desired search fields, vehicle search criteria are provided. Clicking on Filter button 309 will cause a search for matching vehicles to be performed on a database of vehicles and cause a search results screen display 400 shown in FIG. 4 to be generated.

Figure 4:
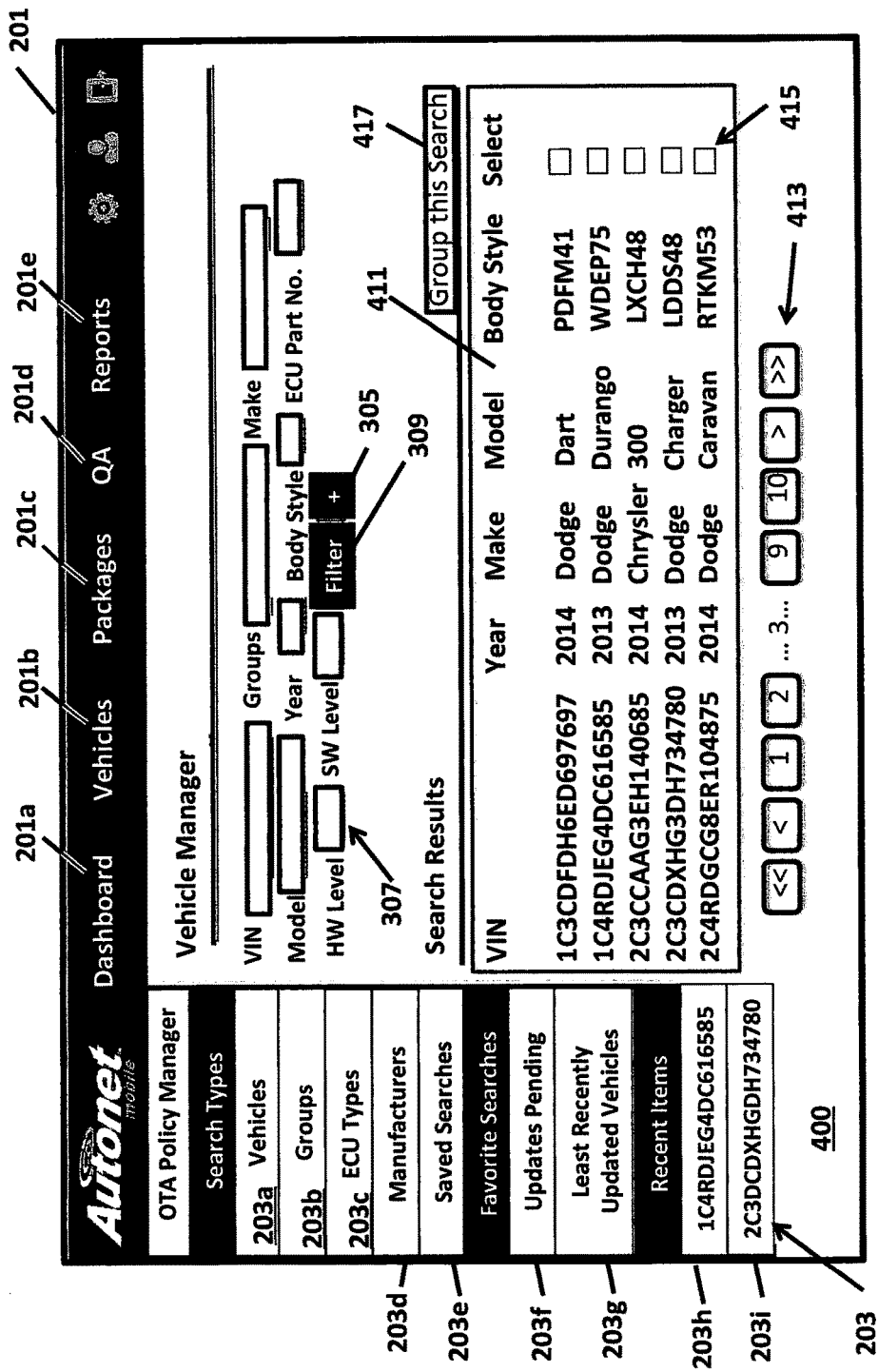
FIG. 4 is a screen shot of the Vehicle Manager vehicle selection showing search results.

Search results screen display 400 provides search results 411 as shown in FIG. 4. The search results 411 shown are a listing of vehicles that meet the search criteria. By clicking on buttons 413, the user may bring up additional results in the search. The user may select any of the search results for inclusion into a group by clicking on boxes 415.

The user may click on Group this Search button 417. After clicking Group this Search button 417, a selection box will be overlayed as a window onto screen display 400 that will allow the user to create a new group or perform other operations on the selected search results including adding the selections into another group.

Figure 5:
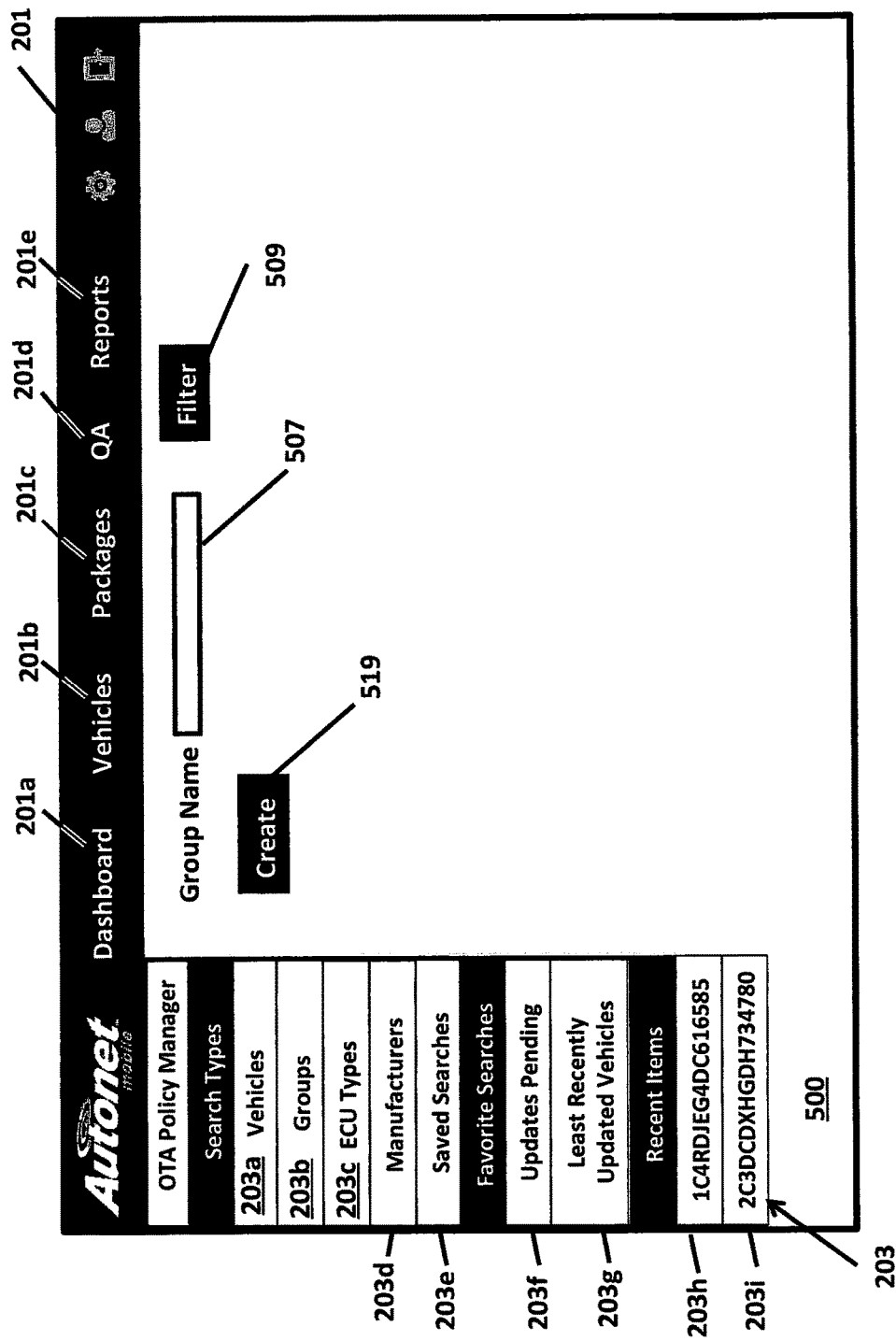
FIG. 5 is a screen shot of the Vehicle Manager group selection.
Figure 6:
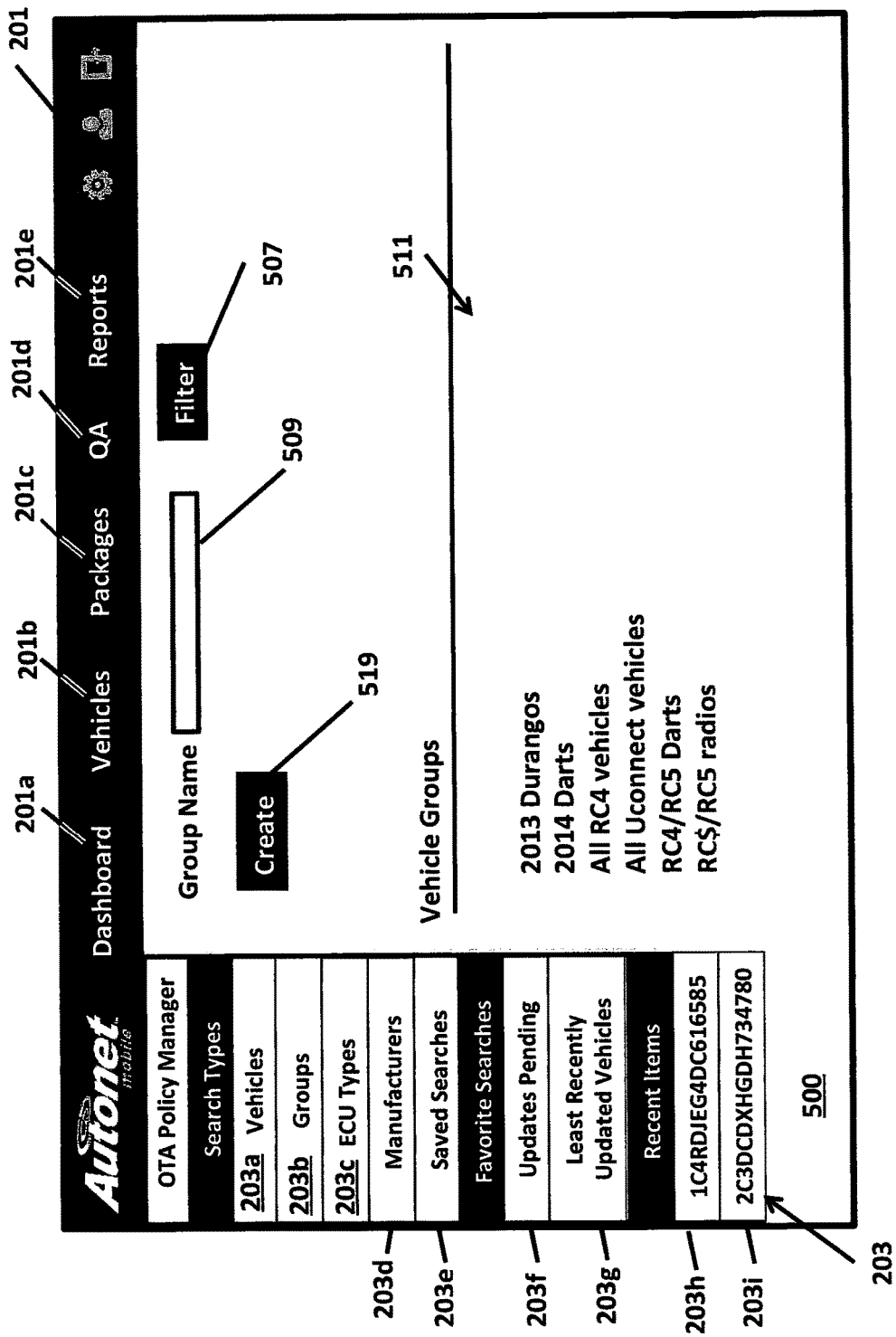
FIG. 6 is a second screen shot of the Vehicle Manager group selection.
Figure 7:
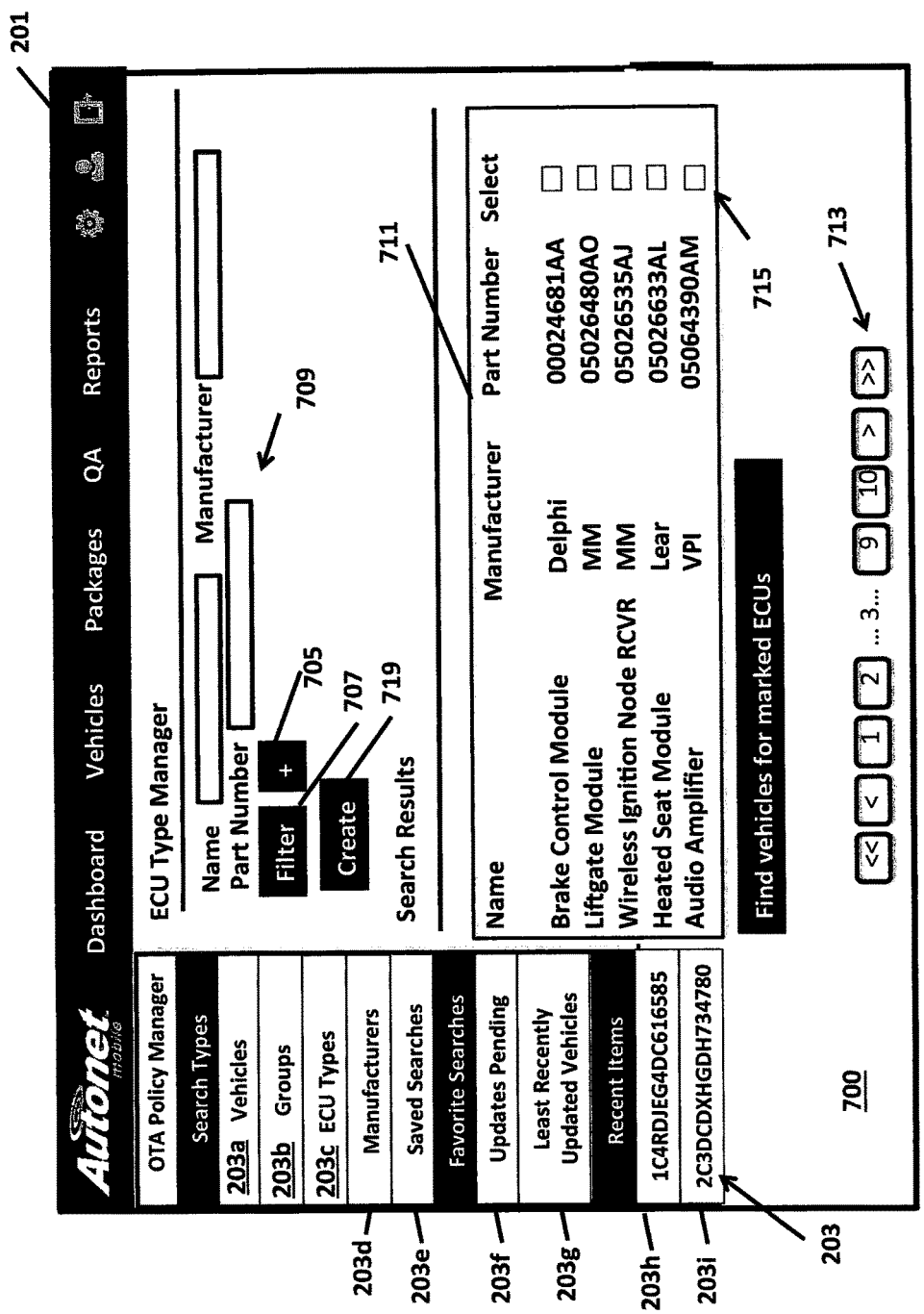
FIG. 7 is a screen shot of a Vehicle Manager ECU type manager.

The user may utilize tool bar 203 to search for and create groups by clicking on Groups button 203b. After clicking on button 203b, screen display 500 shown in FIG. 5 is displayed. A group name search may be conducted by entering the desired name in field 507 and clicking on filter button 509. A listing of the search results will appear in a window 511 shown in FIG. 6.

A group may be created by entering a group name in field 509 and clicking on Create button 519. A window will be opened that will permit attachment of an image file to be associated with the group name in field 509. A further Create button is provided in the window and clicking on the further Create button will associate the image file with the group name.

Clicking on ECU Types button 203c will open an ECU Type Manager with a screen similar to FIG. 5. A series of fields 709 similar to those shown in FIG. 5 including a Name field, a Manufacturer field and a Part Number field. A + button 705, a Filter button 707, and a Create button 719 are provided as shown on screen display 700. A search for ECUs is initiated by filing in the desired search fields 709 and clicking Create button 719. The search results are displayed in window 711.

Because the search results in the embodiment exceed the size of window 711, buttons 713 may be used to scroll through the search results or to select individual portions of the search results. As the search results are viewed, each result may be selected for inclusion into a group by clicking on select boxes 715. A group is created by clicking on Create button 719 to open a window that includes fields for the ECU Type name, supplier, part number and CAN identification. In addition a description field is opened and the ECU type may be identified as safety critical or not.

Figure 8:
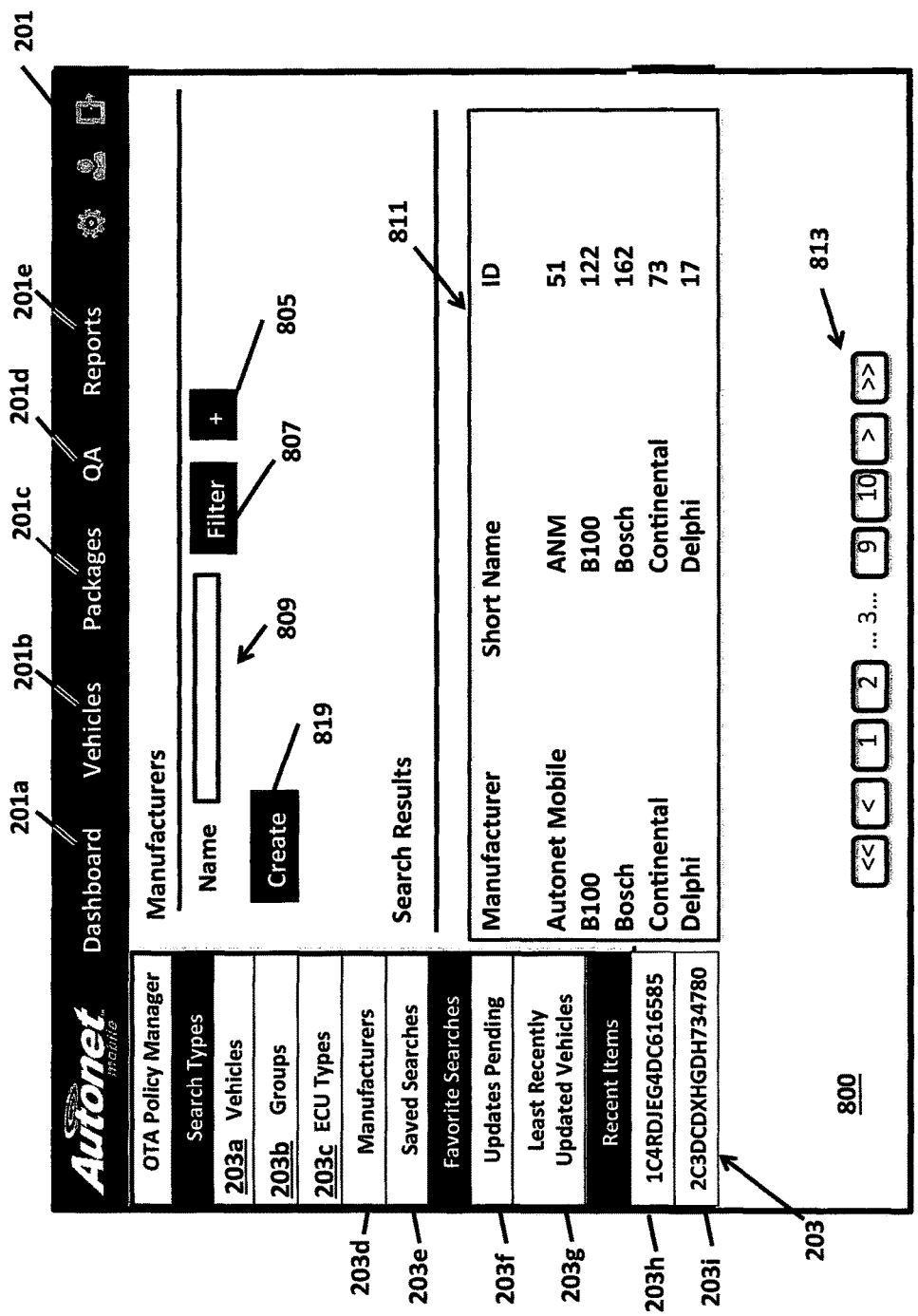
FIG. 8 is a screen shot of a Vehicle Manager manufacturer selection.

Alternatively, a search may be made for all vehicles that include ECUs from a particular manufacturer by clicking on Manufacturers button 203d. Clicking on button 203 results in screen display 800 shown in FIG. 8. The desired manufacturer name is entered in field 909. Addition filter fields may be displayed by clicking on the + button 805. After completing the desired fields, Filter button 807 is clicked and search results are displayed in window 811. The search results may be scrolled through by clicking on buttons 813.

By clicking on Create button 819 a window is opened up that may be used to create a new manufacturer listing.

Figures 9, 10, 10A, 10B, 10C:
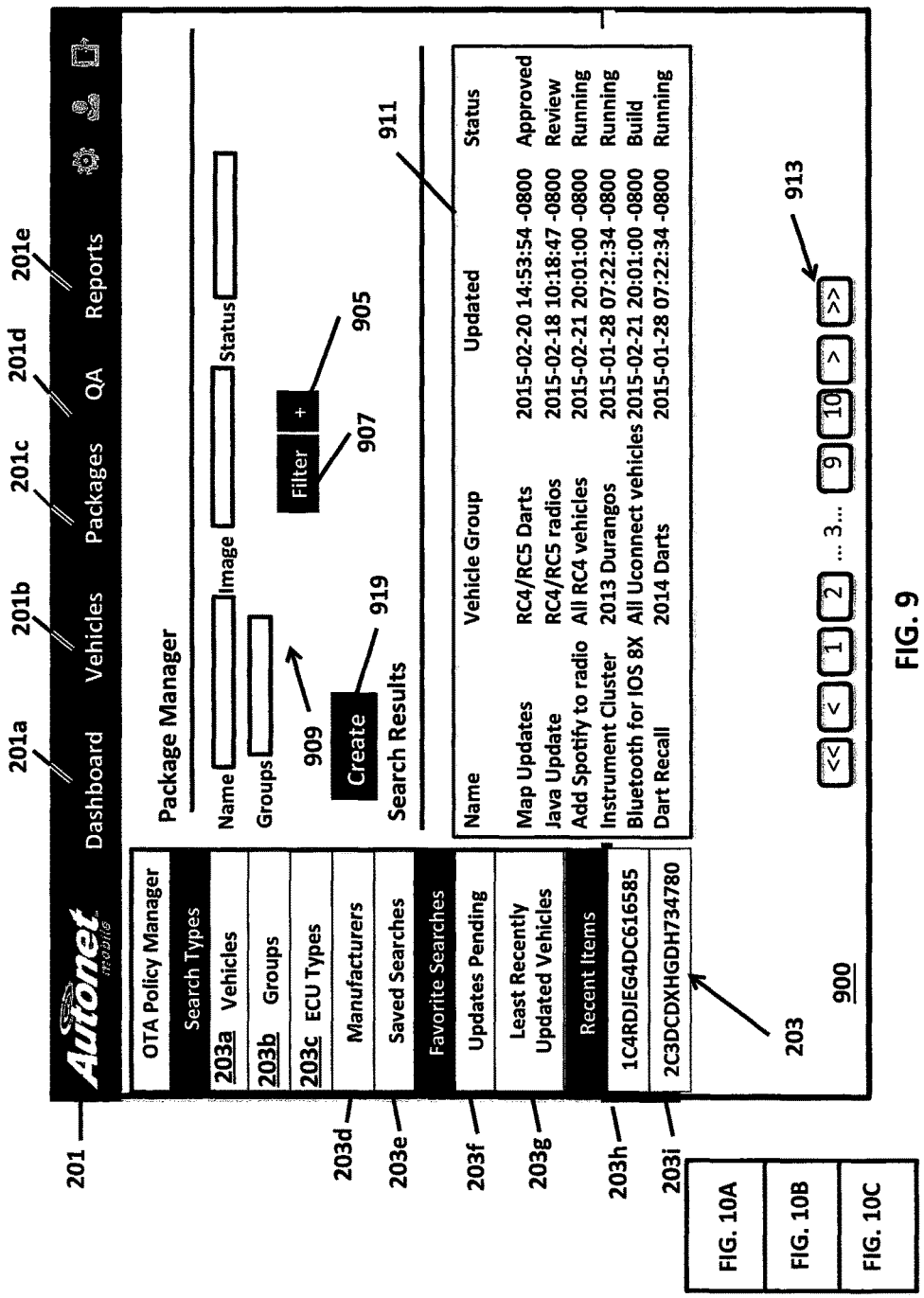
FIG. 9 is a screen shot of a Package Manager selection.
FIG. 10 illustrates how
FIGS. 10A, 10B, and 10C are to be arranged to show a screen shot of the Package Manager.
Figure 10A:
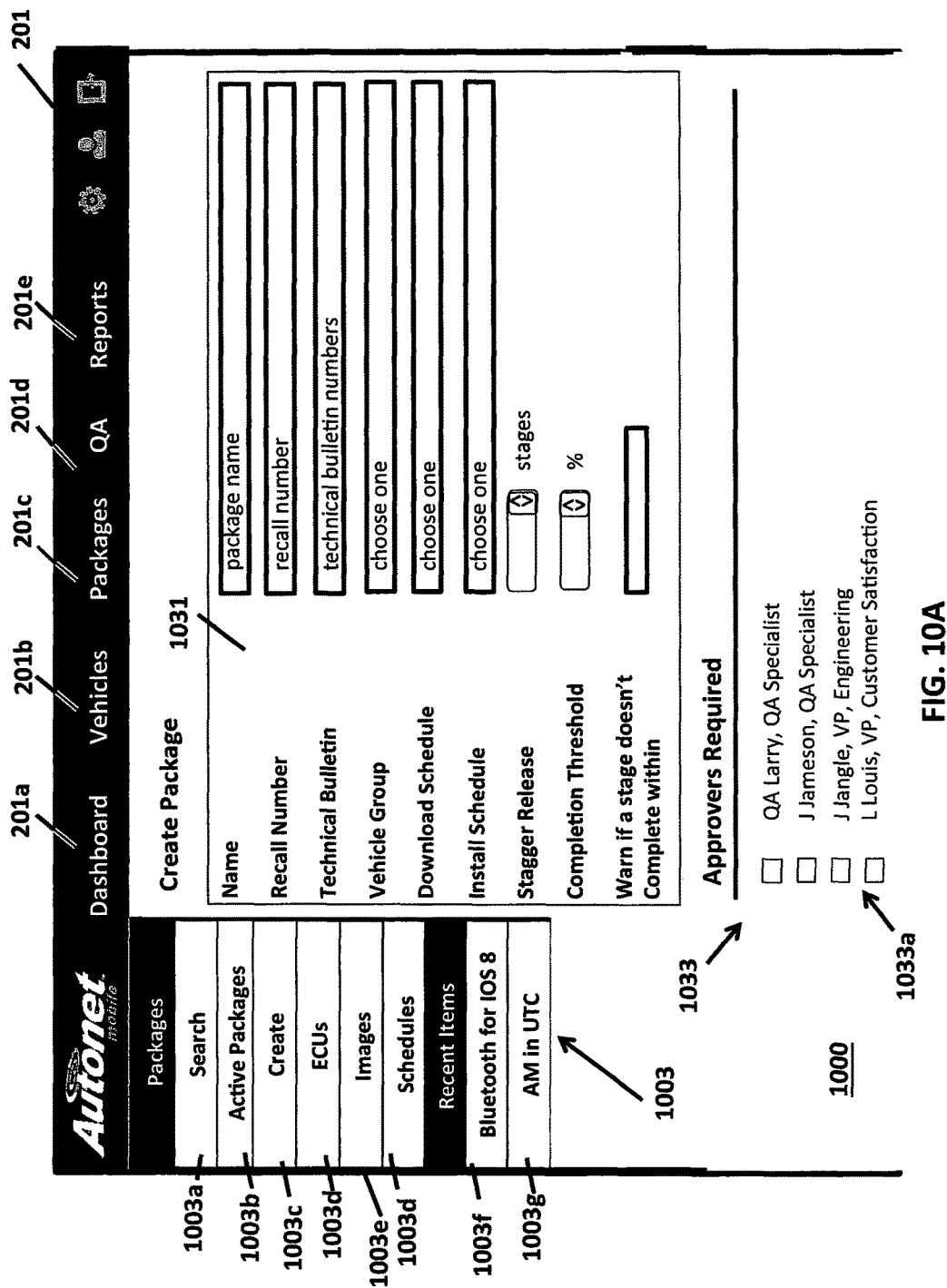
Figure 10B:
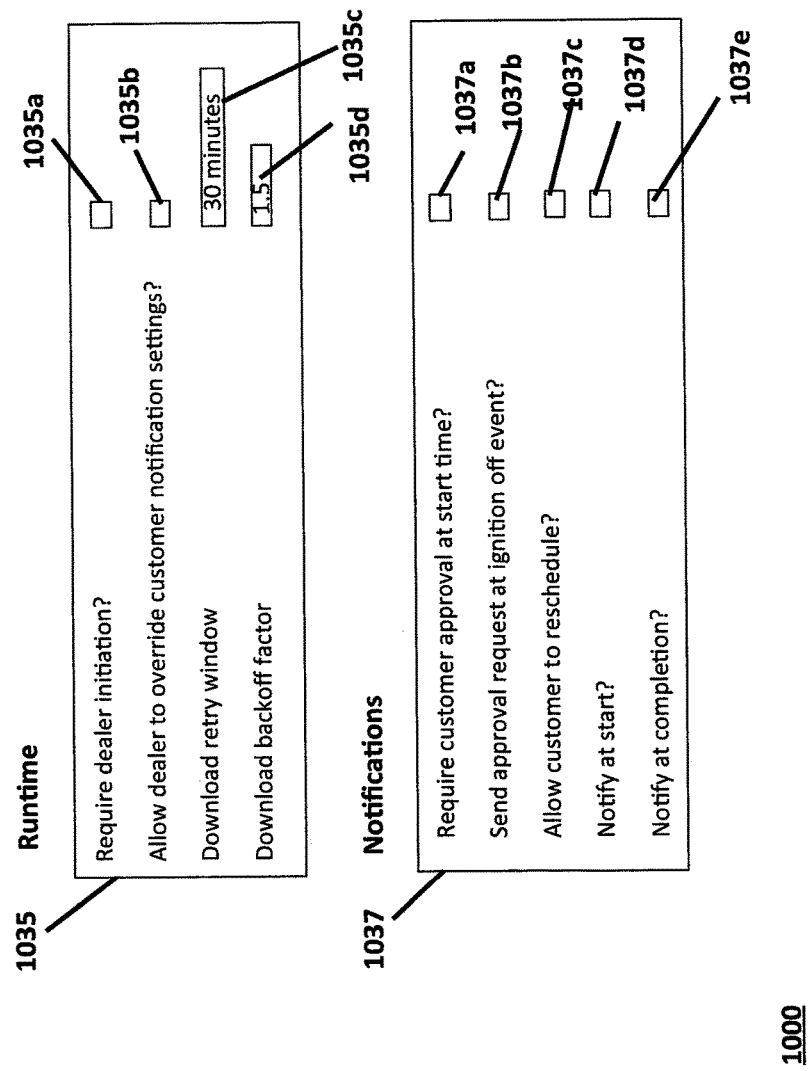

By clicking on Packages button 201c in tool bar 201, Package Manger 109 is activated bringing up screen 900 as shown in FIG. 9. The initial screen displays only the Name field in fields 909. Addition filter fields may be displayed by clicking on the + button 905. After entering information desired in fields 909, Filter button 907 is clicked and search results are displayed in window 911. The search results windows may be scrolled through by clicking on buttons 913. Each search result displayed includes the name assigned to the update, the vehicle group, the updated date and time for the most recent action on the update, and the status of the update. The status indicated may include that the update is being built (Build), the built update is under approval review (Review), the built update has been approved (Approved), or the approve update is in the process of being installed (Running).

Clicking on create tab 919 on screen 900 results in screen 1000 being displayed. Screen 1000 is utilized to create an update package. Screen 1000 comprises a plurality of windows or sections 1031, 1033, 1035, 1037, 1039, 1041, 1043 that are utilized to create an update package.

Window 1031 comprises fields to name the update package (Name), to assign a recall number to the update package (Recall Number), to assign a technical bulletin number or numbers to the update package (Technical Bulletin), select a Vehicle Group, select a Download Schedule for downloading the update package, select an Install Schedule for installing the update package, determining whether the update release should be deployed in smaller sections and selecting the number of smaller sections (Stagger Release), selecting the percentage of completion that each stage must reach before the next stage begins (Completion Threshold), and set the maximum amount of time each stage should require to reach its threshold.

Window 1033 includes a list of approvers that are required prior to release of an update package. The approvers may be selected by clicking the associated one or ones of selection boxes 1033a.

Window 1035 provides choices for runtime of the update package. In some instances, it may be desirable for update packages to be initiated only at a vehicle dealer. In that circumstance the user will click on box 1035a. In other instances, where a customer has been notified of an update, the dealer may override the customer notification setting by clicking on box 1035b. In the event that a download of the update package for an individual vehicle does not occur when scheduled, a time for retrying to download the update package after each attempt may be selected by setting a time in box 1035c. A multiplier to be applied to the time in box 1035c for subsequent download retries may be entered in box 1035d.

A selection of various notifications may be made for the update package by checking boxes 1037a, 1037b, 1037c, 1037d in box 1037e.

Update text and email messages may be sent to vehicle owners by utilizing the message selection buttons 1039a, 1039b, 1039c, 1039d in window 1039.

The ECU update image to be included in the update package is entered in window 1041.

Window 1043 is utilized to add rules that apply to update installation. Clicking on button 1043a will open up various rule selection options. By way of non-limiting example, the rules may include ECU identification, ignition status (ignition on, ignition in accessory position, ignition key in, ignition key out), battery voltage level, transmission status (neutral, park), engine status (on, off), vehicle level, door status (locked, unlocked, open), occupant status (driver present, driver not present, passenger present, passenger not present), motion status (vehicle in motion, vehicle stopped).

After completion of all the create package fields, clicking on button 1047 will create the package. Alternatively the entries may all be cancelled by clicking on button 1045.

Figure 11A:
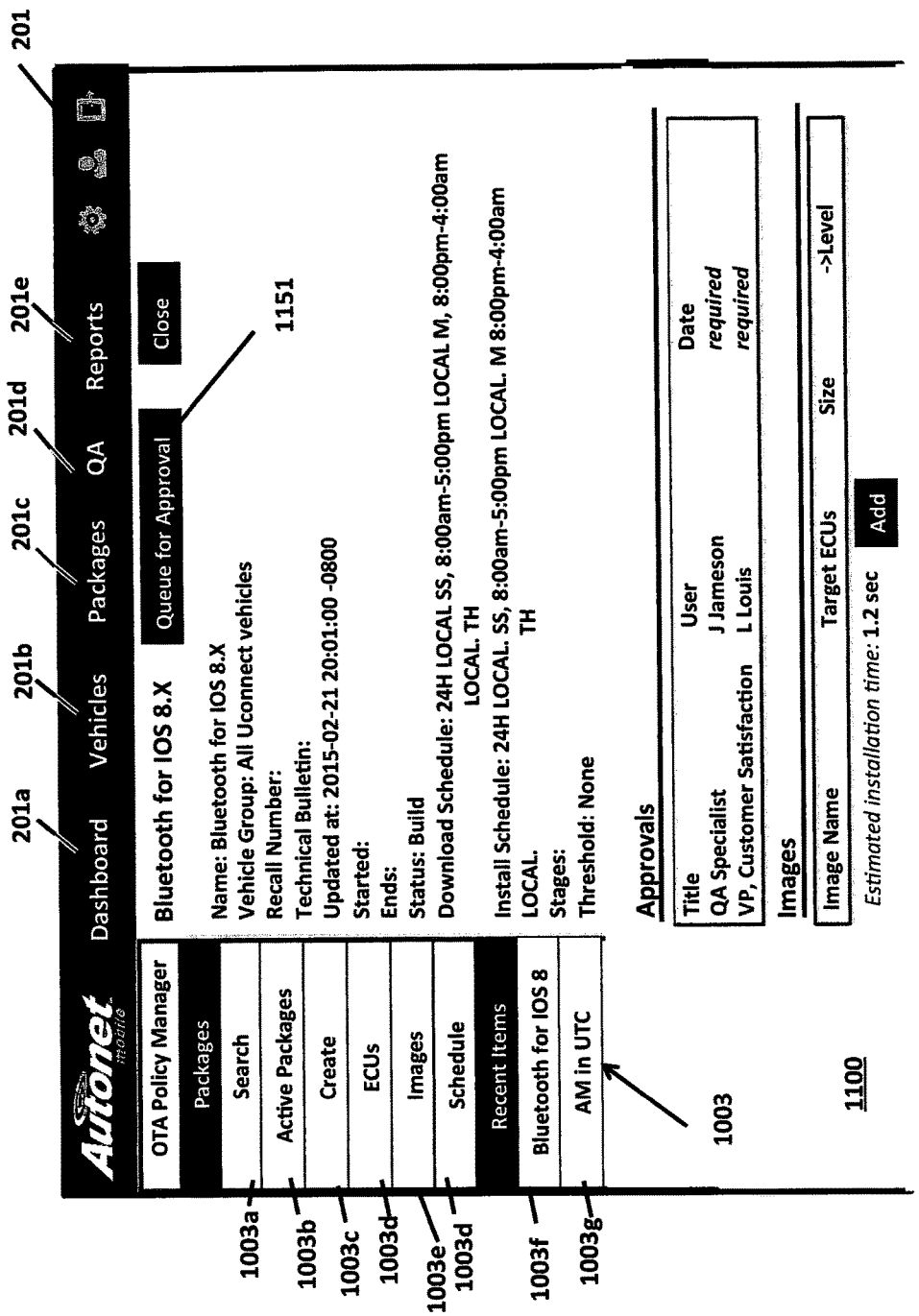

Clicking on tab 1003*f* in toolbar 1003 causes a recently worked on update package to be displayed. The selected update package is shown in screen display 1100 shown in FIG. 11 Of particular interest is that the status of the pending update packages is shown. If the update package is still in the process of being built the status is indicated as "Build". Once an update is built, it is submitted for approval, the status is indicated as "Review" and upon being approved the status is indicated as "Approved". Clicking on the button Queue for Approval 1151 submits the update package as configured to the individuals designated for approval.

Figure 12:
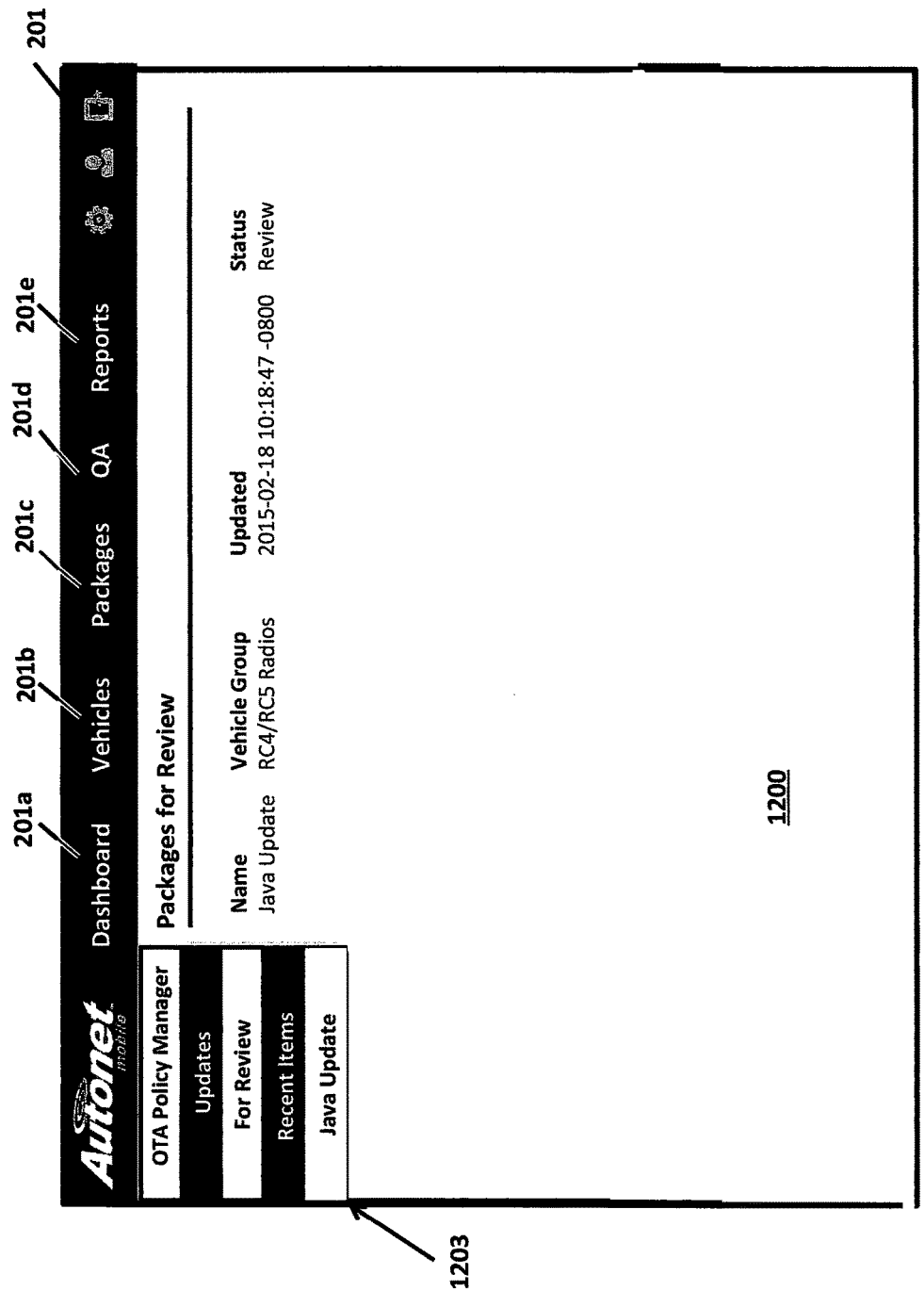
FIG. 12 is a screen shot of a screen accessed when the Quality Assurance (QA) tab is selected.

Clicking on the QA tab 201*d* opens up screen 1200 shown in FIG. 12 that shows update packages that are Queued for Approval.

Figure 13A:
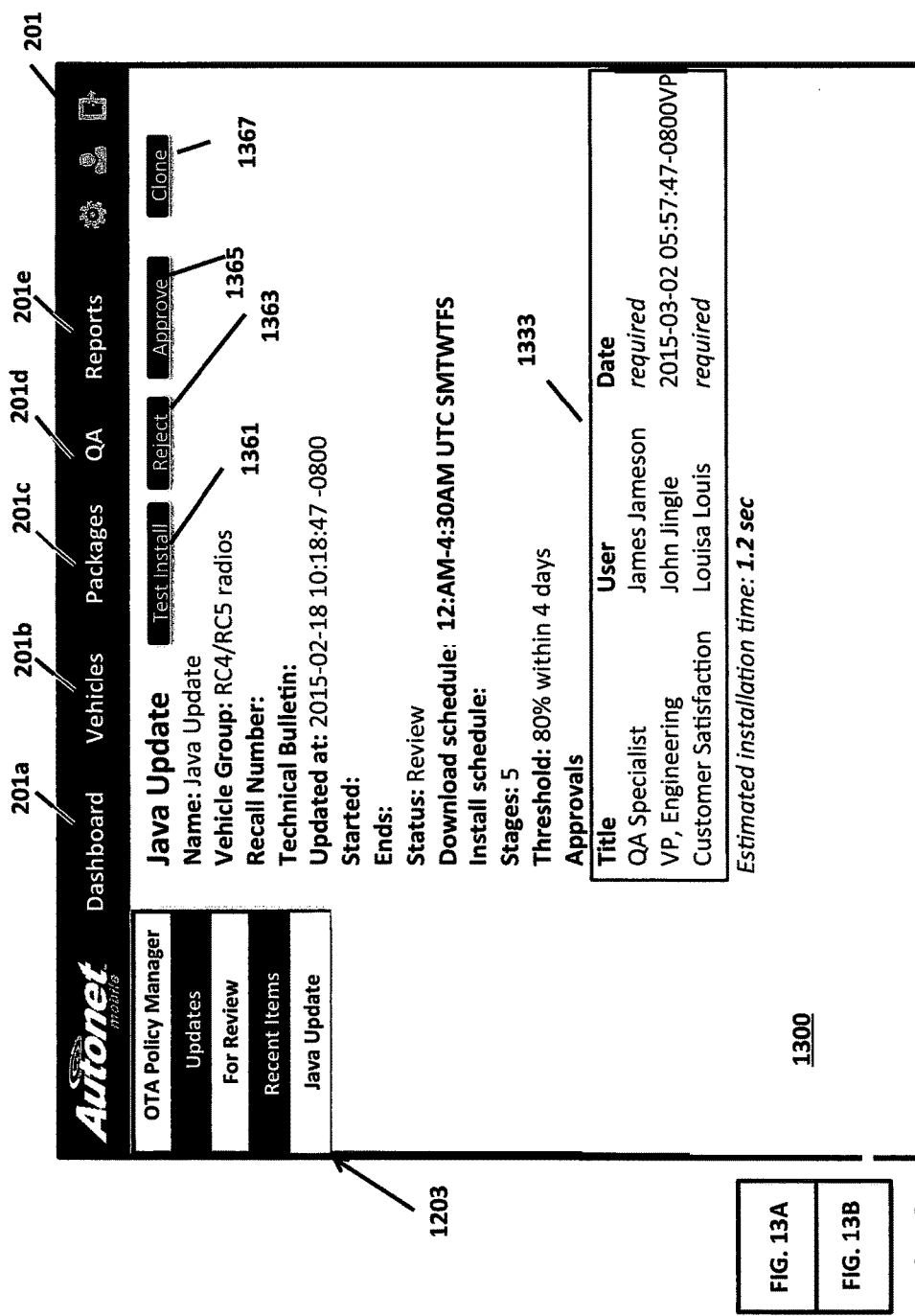

Clicking on the package listed on screen 1200 results in details of that package being displayed in screen 1300 shown in FIG. 13. Clicking on Test Install button 1361 will open up a window to install the update package on a test vehicle. That window will permit identification of the test vehicle by VIN, and will set out the vehicle rules and install schedule. The window will also permit overriding any default scheduling of the install package and overriding any customer notifications.

Clicking on Reject button 1363 will allow disapproving of the update package and open it for editing.

Clicking on Approve button 1365 approves the update package for deployment.

Clicking on Clone button 1367 will cause the update package to be cloned.

Figure 14:
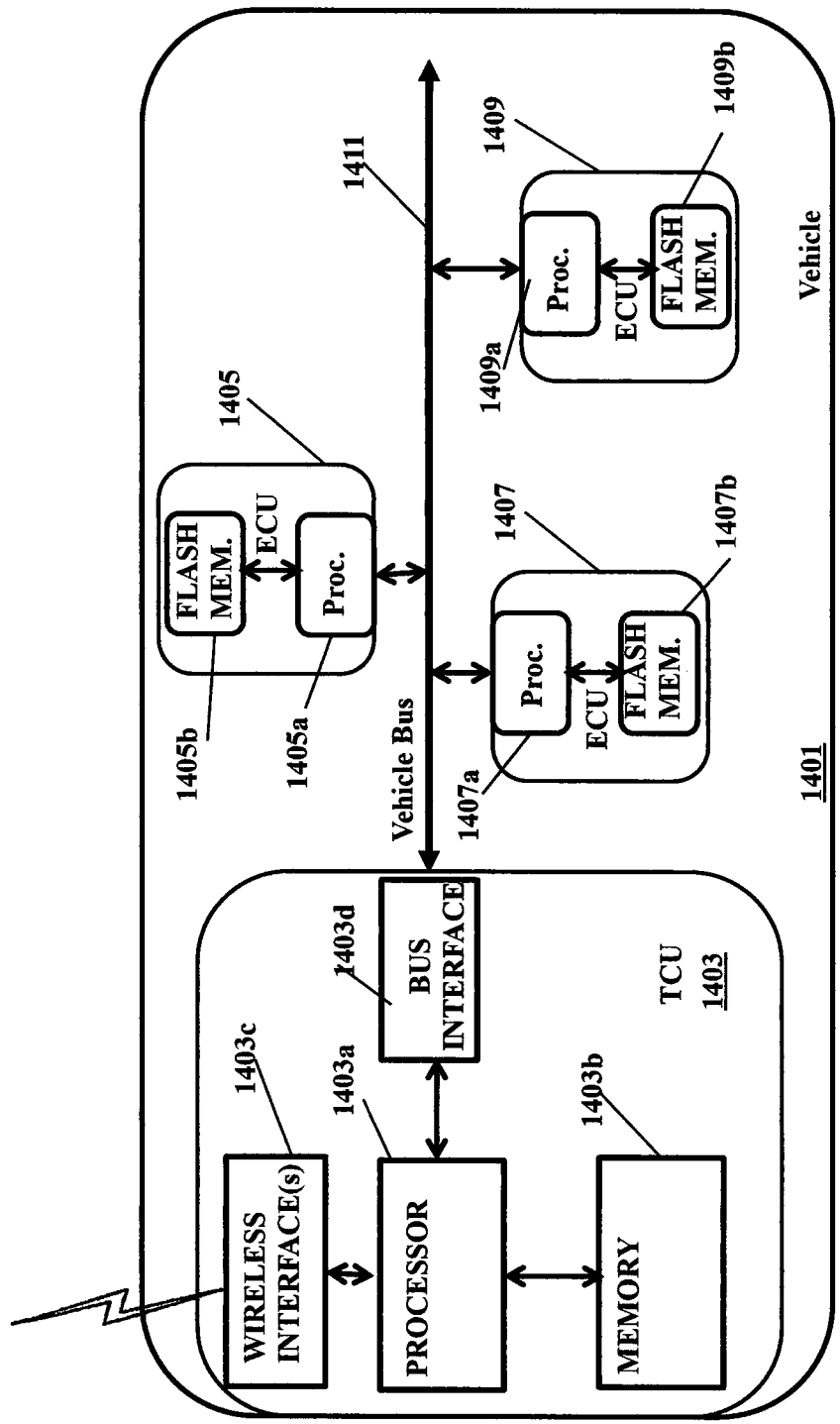
FIG. 14 is a block diagram of a telematics control unit.

Turning now to FIG. 14 a representation of an electronic system of a vehicle 1401 is shown. Vehicle 1401 comprises a TCU 1403, a plurality of ECUs 1405, 1407, 1409 and an electronic bus 1411 that permits TCU 1403 to communicate with each of the ECUs 1405, 1407, 1409.

Although only three ECUs 1405, 1407, 1409 are shown and described, those skilled in the art understand that the number of ECUs shown in merely representative and the number of ECUs may be more or less. Each ECU comprises a processor 1405*a*, 1407*a*, 1409*a* and a flash memory 1405*b*, 1407*b*, 1409*b*.

As shown in FIG. 14, the TCU 1403 comprises a processor 1403*a*, memory 1403*b*, wireless communication interface 1403*c*, and an interface to vehicle electronic bus 1411. As used herein, a "processor" may include any controller, microcontroller, processor or microprocessor or any combination of two or more of any of the foregoing. Wireless communication interface 1403*c* is capable of sending and receiving data wirelessly to and from a gateway 1524 shown in FIG. 15.

Figure 15:
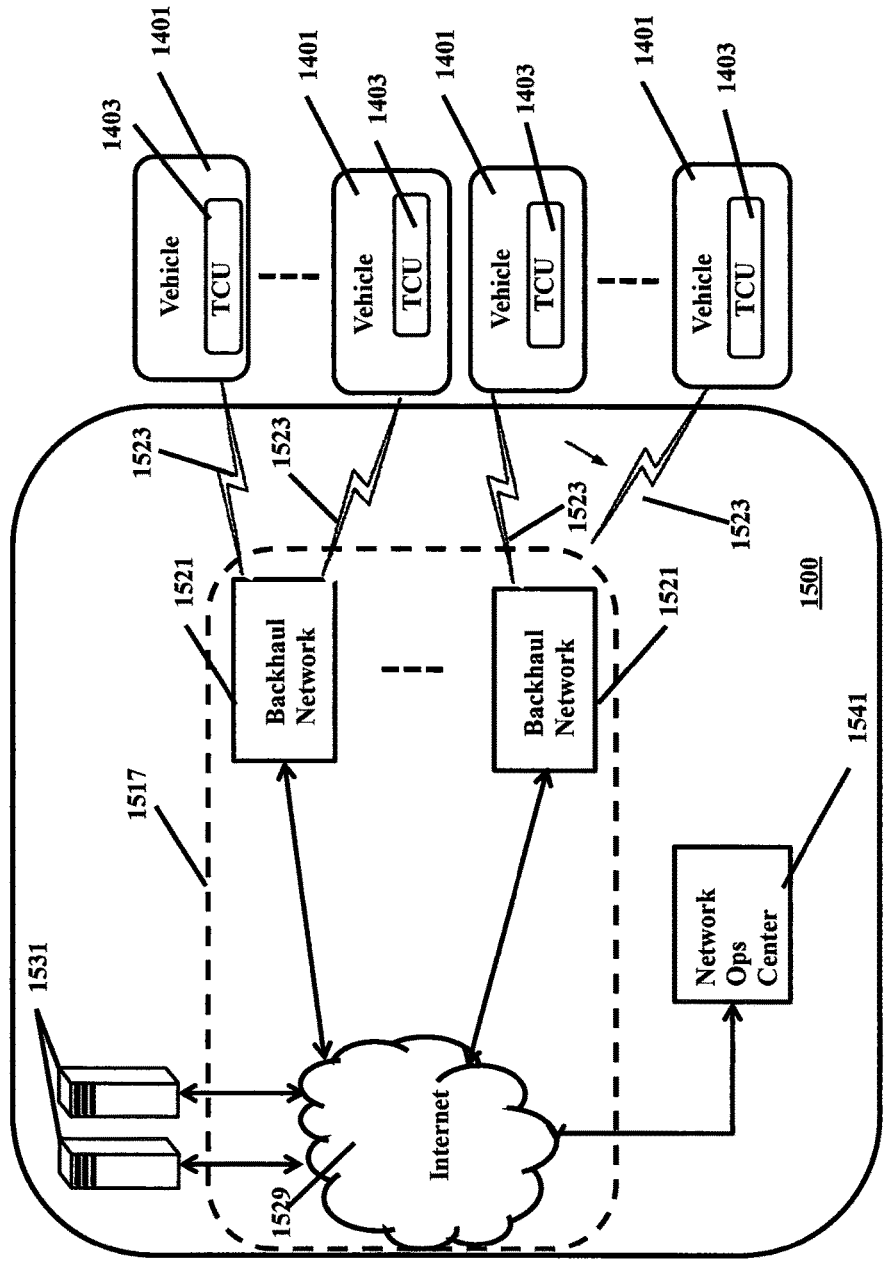
FIG. 15 is a block diagram of a portion of an update system.

Wireless communication interface 1403*c* enables TCU 1403 to access a wireless communication network shown in FIG. 15. Wireless communication interface 1403*c* may comprise more than one type of wireless capability including various short range wireless communication link capability such as Wi-Fi and Bluetooth in addition to longer range wireless communication link capability such as any one of cellular or mobile telephone capabilities. In one embodiment of the invention wireless communication interface 1403*c* enables TCU 1403 to receive update packages wirelessly from a vehicle dealer or from a vehicle manufacturer. Although not shown in the drawing figures, wireless communication interface may include or be coupled to one or more antennas.

Update packages received wirelessly are stored in memory 1403*b*. Memory 1403*b* may comprise one or more types of memory.

Bus interface 1403*d* couples TCU 1403 to vehicle bus 1411 and is used to communicate data between TCU 1403 and each of the ECUs 1405, 1407, 1409.

Each ECU 1405, 1407, 1409 comprises a processor 1405*a*, 1407*a*, 1409*a* and a corresponding flash memory 1405*b*, 1407*b*, 1409*b*. Flash memories 1405*b*, 1407*b*, 1409*b* store parameters and software that is utilized by the corresponding processor 1405*a*, 1407*a*, 1409*a*.

Turning now to FIG. 15 a wireless OTA update system 1500 is shown in which simultaneous wireless updating of a plurality of vehicles 1401 may be managed. System 1500 provides a wireless network 1517 that may simultaneously connect to the plurality of vehicles 1401.

Download manager 113 of FIG. 1 may reside on servers 1531 and communicate with each TCU 1403 via wireless network 1517. FIG. 15 shows two servers 1531. In the embodiment of FIG. 1531 the two servers are a backup pair and only one of the two servers communicates via wireless network 1517 at a time. In other embodiments, unduplicated servers may be utilized and it is intended that when reference is made to a server or servers, that the server or servers may be duplicated or not. Each server 1531 communicates with TCUs 1403 via the Internet 1529 and wireless backhaul networks 1521.

Figure 16:
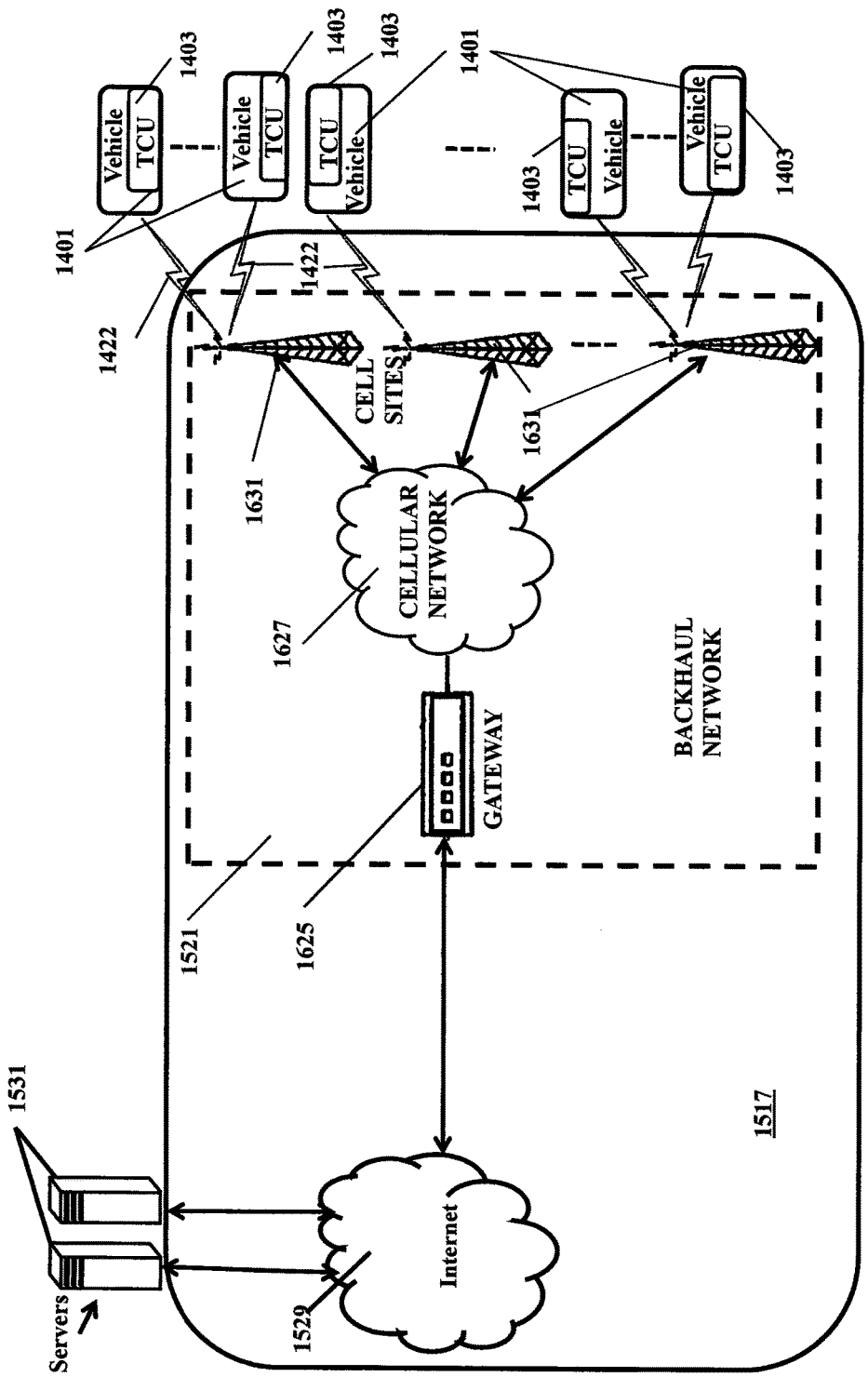
FIG. 16 is a more detailed portion of the update system of FIG. 15.

FIG. 16 shows in greater detail a portion of wireless backhaul network 1521. Internet 1529 connects servers 1531 to backhaul network 1521. Backhaul network 1521 in this embodiment comprises a gateway 1625 coupled to cellular network 1627 that provides wireless links 1422 to vehicles 1401 via cell sites 1631.

Each TCU 1430 sends ongoing progress information to a server. Given the large number of vehicles that may need to be updated at the same time, there are many communication servers available in a distributed network. Each communication server can receive status updates from thousands of vehicles simultaneously, producing a stream of data that is typically sent to a log file. Human monitoring of all the distributed streams of data is a challenge.

A client may use a long-session protocol to establish a connection to an arbitration server. The client provides filtering terms and other parameters necessary to reduce the stream to only what the user wishes to see. Additional parameters are provided to control formatting and presentation.

The arbitration server establishes connections to all communication servers for which the filtering terms may apply. These connections also include the filter terms relevant for each communication server. The arbitration server may have multiple connections open to any subset of all available communication servers.

As the communication servers produce their streams of data, each message is compared to the filtering terms provided by the arbitration server. If the terms match, then the message is forwarded to the arbitration server. This activity does not otherwise interfere with the routine logging or retention of the data.

The arbitration server combines all the data streams for each client, applies the requested filtering, formatting, and presentation, then transmits the data to the client.

The client receives the data and presents it to the user.

Figure 17:
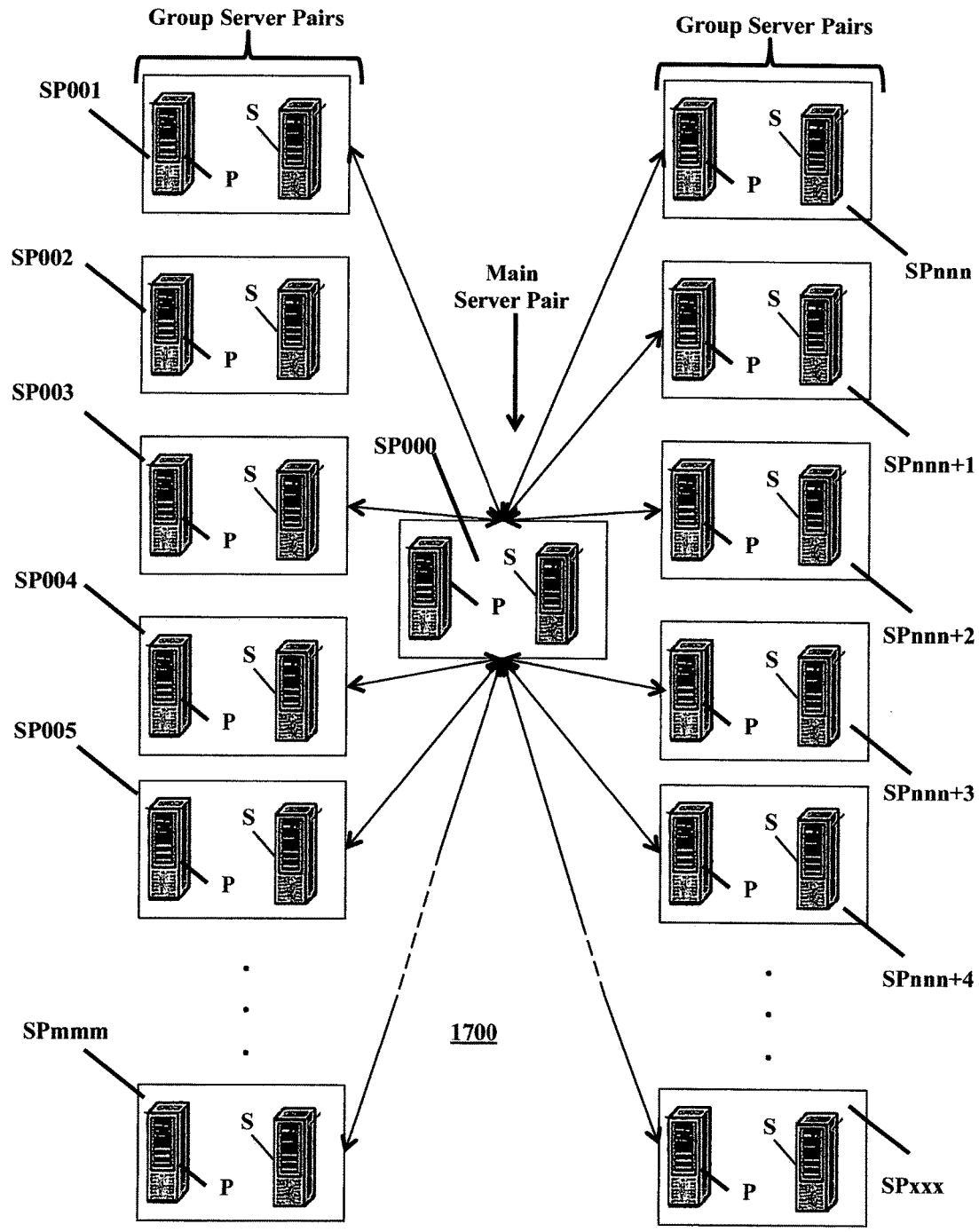
FIG. 17 illustrates details of an expandable router network.
Figure 18:
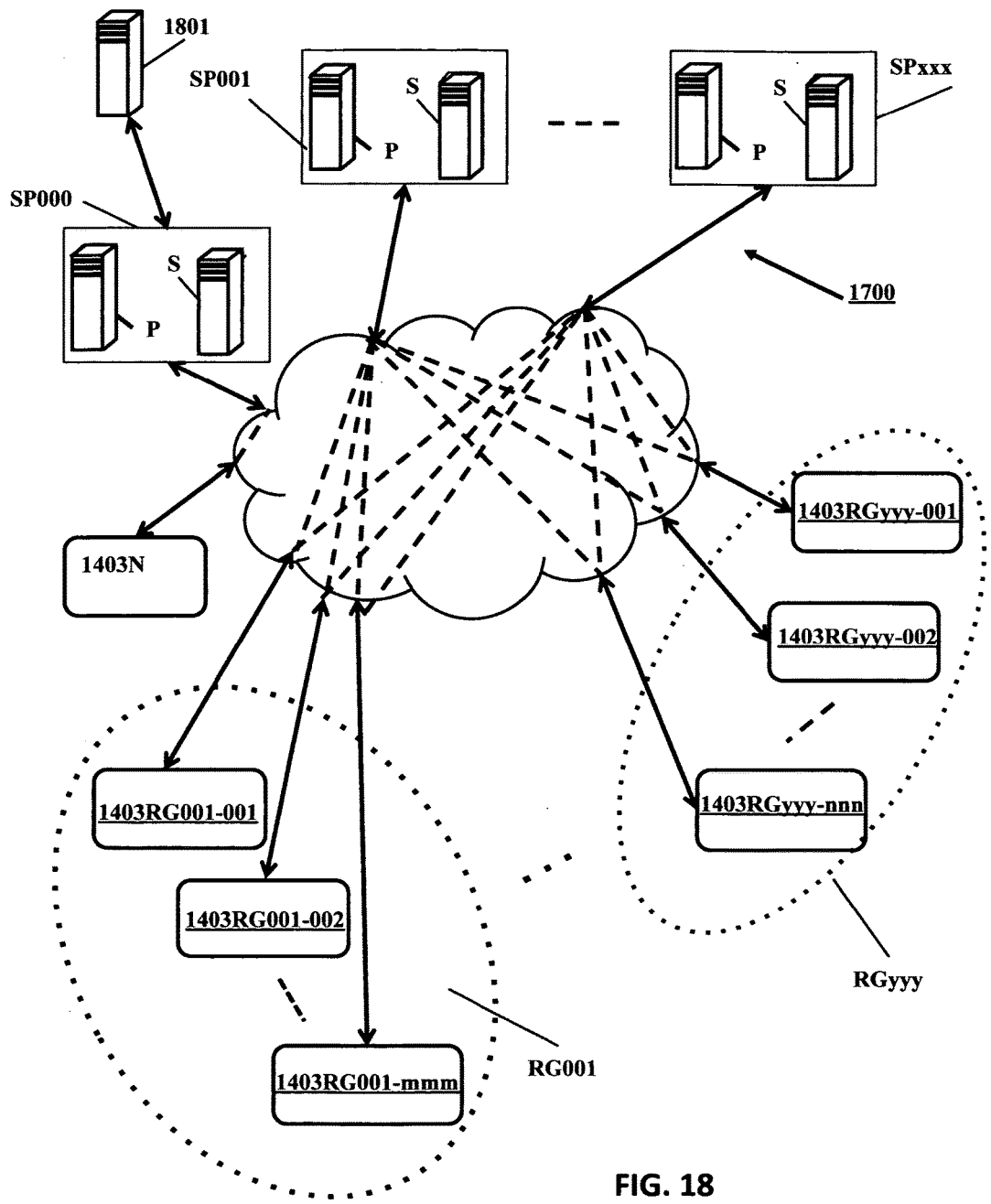
FIG. 18 illustrates further details of the network of FIG. 6.

FIGS. 17 and 18 illustrate a network 1700 comprising a main or arbitration server SP000 and a plurality of communication or group servers SP001 . . . SPxxx arranged as a distributed network. Distributed network 1700 is an expanded version of network 100 shown in FIGS. 1, 2, and 3. Each TCU 1403 is operable such that its initial communication to network 1700 utilizes main server information stored in its memory 1403b to establish a first communication with main server SP000. Each TCU 1403 controller 1403a may interact with main server SP000 to upload the configuration information from memory 1403b to main server SP000 via network 1700.

Each TCU 1403 is operable to receive group server identification information from main server SP000 when communicating with main server SP000 a second time. Controller 1403a is operable to store the group server identification information in memory 1403b. The group server information comprises information identifying one or more servers corresponding with a predetermined group assigned by main server SP000. Each TCU 1403 utilizes the group server identification information for subsequent communication via network 1700.

Group server identification information is received by communications each TCU 1403 from main server SP000 the second time TCU 1403 establishes communication with main server SP000. Each TCU 1403 utilizes the group server identification information to access one group server of the plurality of group servers SP001, . . . , SPxxx.

The group server identification information comprises identification information for a predetermined number of group servers selectively assigned from the plurality of group servers SP001, . . . , SPxxx.

Turning back to FIG. 14, each controller 1403a is operable to select a group server from the predetermined number of group servers with which to communicate via network 1700. Controller 1403a selects the group server from the predetermined number of group servers in accordance with a predetermined selection algorithm. In one embodiment, the group server is selected by accessing the first available group server by attempting to access the group servers in a sequential order as stored in memory 1403b.

Although the above description refers to each server in the singular, in an embodiment of the invention, each group server SP001, . . . , SPXXX shown in FIG. 17 comprises a corresponding pair of servers P, S that are identically configured.

One group server P, S of each group server pair operates as a primary server P to track and monitor the plurality of mobile routers and the corresponding paired server is selected as a backup secondary server S. Each primary group server P and its corresponding secondary server S operate such that data in primary group server P is replicated into its corresponding secondary server S.

Primary group server P and the secondary server S operate to determine if a failure occurs in the primary group server; and the primary group server P and the secondary server S operate to automatically switch to the secondary server as primary group server upon occurrence of a failure. After the original primary group server P is repaired, it is manually switched back in service.

The group server pairs SP001, . . . , SPxxx are dispersed to be located at dispersed geographic locations and have different network peering points.

When a new mobile router TCU 1403 is provisioned at the factory, it is configured to talk to the "main" communications server pair SP000 at a network operations center by storing access information for "main" communications server pair SP000 in memory 1403b. Each newly provisioned mobile router 1403 registers with the "main" communications server pair SP000 and uploads its configuration information to "main" communications server pair SP000. When TCU 1403 registers with the "main" communications server pair SP000 it calls into an "unassigned" server group address by default.

Upon the occurrence of a specific event, such as when vehicle 1401 containing TCU 1403 is initially shipped it is assigned to a group selected from a plurality of groups RG001-RGyyy. The group to which a TCU 1403 is assigned may be specific to a dealer or geographic area or is assigned based upon some other criteria.

The next time TCU 1403 comes on line and talks to main communications server pair SP000, main communications server pair SP000 will identify that TCU 1403 has been assigned to a group selected from the groups RG001 through RGyyy that is different from the "unassigned" group. Main communications server pair SP000 will then reassign TCU 1403 to talk to a new communications server pair that handles the group to which TCU 1403 has been assigned by downloading the new communication server pair access information to memory 1403b. The new communications server pair is selected from the communications server pairs SP001 through SPxxx There can be multiple communications server pairs per group and each communications server can support multiple groups.

Each TCU 1403 is configured by main communications server pair SP000 with addresses for multiple communications server pairs. The addresses for the multiple communication server pairs are stored in each TCU 1403 memory 1403b. Each TCU 1403 will access the server addresses stored in its corresponding memory 1403b in a predetermined order. If a communication server pair associated with a first address is unavailable, TCU 1403 will access the next address of a communications server stored in memory 1403b. TCU 1403 will access communications server addresses from TCU 1403 in predetermined order until communications with a corresponding communications server is established.

Main server pair SP000 includes a manager program. The manager program is provided so that main server pair SP000 may communicate to all of communications servers SP001-SPXXX, so an operator of the network system never needs to know which communications server communicates with which router. The communication by main server pair SP000 to server pairs SP001-SPXXX is illustrated in FIG. 18.

Communications server pairs SP001-SPXXX do not need to be located in the same facility. It is preferable that the communications server pairs SP001-SPXXX are not in the same facility. It is highly preferable that the communications server pairs SP001-SPxxx are geographically disperse and have different network peering points.

With the server network architecture described above, added capacity is easily added by simply adding additional server pairs and configuring them as available within the system manager at the network operations center SP000.

In various embodiments, a networked system 1700 comprises: a plurality of vehicle TCUs 1403N, 1403RG001-001, . . . , 1403RGyyy-nnn; a main server SP000; and a plurality of group servers SP001, . . . , SPxxx. Each TCU 1403N, 1403RG001-001, . . . , 1403RGyyy-nnn is initially configured to communicate with the main server SP000. A first linked communication between each TCU 1403N and main server SP000 is provided. Each TCU 1403N, 1403RG001-001, . . . , 1403RGyyy-nnn is operable to initially register with main server SP000 and operable to upload configuration information from each TCU 1403N, 1403RG001-001, . . . , 1403RGyyy-nnn to main server SP000. Main server SP000 is operable to assign each TCU 1403N, 1403RG001-001, . . . , 1403RGyyy-nnn with at least one predetermined group selected from a plurality of predetermined groups RG001, . . . , RGyyy. Main server SP000 is operable, subsequent to registering and assigning TCU 1403N to reassign each TCU 1403N to communicate with at least one group server assigned to communicate with the predetermined group RG001, . . . , RGyyy by providing each TCU 1403N, with the address of at least one corresponding group server. In the embodiment shown, TCU 1403N has not been assigned to a group yet and TCUs 1403RG001-001, . . . , 1403RGyyy-nnn are assigned to their corresponding groups.

Main arbitration server SP000 is operable to reassign each TCU 1403N, 1403RG001-001, . . . , 1403RGyyy-nnn with a predetermined number of group server addresses; and each TCU 1403N, 1403RG001-001, . . . , 1403RGyyy-nnn is operable to communicate with a corresponding predetermined number of group servers SP001, . . . , SPyyy selected from the plurality of group servers. Each group server address corresponds to one of the predetermined number of group servers SP001, SPyyy.

Each TCU 1403N, 1403RG001-001, . . . , 1403RGyyy-nnn is operated to communicate with one of the predetermined number of group servers SP001, . . . , SPyyy corresponding to one of the predetermined number of addresses.

In the methodology of an embodiment, a method comprises the steps of providing a plurality of TCUs 1403N, 1403RG001-001, . . . , 1403RGyyy-nnn; providing a main server SP000 for tracking and monitoring the plurality of TCUs 1403N, 1403RG001-001, . . . , 1403RGyyy-nnn; initially configuring each TCU 1403N, RG001-001, . . . , 1403RGyyy-nnn to communicate with the main server SP000; providing a first linked communication between each TCU 1403N, 1403RG001-001, . . . , 1403RGyyy-nnn and main server SP000; registering each TCU 1403N, 1403RG001-001, . . . , 1403RGyyy-nnn with main server SP000 and uploading configuration information from each TCU 1403N, 1403RG001-001, . . . , 1403RGyyy-nnn to main server SP000; assigning each TCU 1403N, 1403RG001-001, . . . , 1403RGyyy-nnn with a predetermined group SP001, . . . , SPyyy; subsequent to the registering and assigning steps, providing a second linked communication between each TCU 1403N, 1403RG001-001, . . . , 1403RGyyy-nnn and main server SP000; and operating main server SP000 such that when the second linked communication occurs, main server SP000 reassigns each TCU 1403N, 1403RG001-001, . . . , 1403RGyyy-nnn to communicate with at least one group server SP001, . . . , SPyyy assigned to communicate with the predetermined group.

The embodiment may further comprise providing at least one group server SP001, . . . , SPyyy with a corresponding paired group server P, S. Each server P and its corresponding paired server S are identically configured. The embodiment further comprises: selecting at least one group server P as a primary server to track and monitor the plurality of TCUs; selecting the corresponding paired server as a secondary server; and replicating data in the primary group server into the secondary. The replicating data step may be performed in real time.

The embodiment may even further comprise determining if a failure occurs in the primary server P; and automatically switching to the secondary server S as primary server upon determination of occurrence of the failure.

Still further, the embodiment may include repairing the primary server having the failure; and utilizing manual switchover to place the repaired server back in service.

Advantageously distributed network 1700 may be utilized to provide simultaneous updates to large numbers of vehicles by association of each vehicle's TCU to corresponding group servers.

The interaction between a communication or group server and a target TCU 1430 follows the following sequence:
  The communication server sends a notification to a target TCU 1430;
  TCU 1430 connects to the communication server;
  The communication server sends a software/hardware inventory request to target TCU 1430;
  TCU 1430 sends the software/hardware inventory request;
  The communication server sends a download command;
  If command is "download" TCU 1430 will download a differential update package DUP via a communication server and then send "download complete" to the communication server;
  The communication server sends "install" command with prerequisite rules to TCU 1430; and
  TCU 1430 installs the differential update at the appropriate time.
  TCU 1430 sends notifications to server on update install start, progress and end.

An embodiment is provided for a method for wireless remote updating of vehicle software of one or more target ECUs 1405, 1407, 1409 in a target vehicle group comprising one or more vehicles 1401, each ECU 105, 1407, 1409 comprising a flash memory 1405a, 1407a, 1409a. The method comprises hosting manager software 103 on a server that is one of a client server or a central server accessible by a client. The method further comprises utilizing the manager software 103 for: selecting the target vehicle group; generating a differential update package (DUP) for the target vehicle group, the DUP comprising update manager software 121; selecting update prerequisites for executing the DUP; and selecting update scheduling for downloading the DUP. The method further comprises: providing download manager software 113 for downloading the DUP to each one or more target vehicles 1401, and utilizing the download manager software for: establishing a separate wireless communication link 1422 to a TCU 1403 in each target vehicle 1401 of the target vehicle group; and utilizing the download manager software 113 to download the DUP to each TCU 1403 via each separate wireless communication link 1422. The method further comprises utilizing the update manager in each TCU to update the one or more target ECUs in each target vehicle by utilizing the DUP to reflash each flash memory 1405a, 1407a, 1409a of the one or more target ECUs 1405, 1407, 1409.

The embodiment may further comprise: providing the DUP with an update rule set and utilizing the update manager software 121 at each TCU 1403 to update each target ECU 1405, 1407, 1409 flash memory 1405a, 1407a, 1409a by performing the following steps: validating each target ECU 1405, 1407, 1409 flash image downloaded to each TCU 1403; validating the updated rule set downloaded to each TCU 03; and updating each target ECU 1405, 1407, 1409 in compliance with the rule set.

The embodiment may further comprise: utilizing download manger software 113 to provide update interaction with each TCU 1403 via separate wireless communication link 1422.

The embodiment may comprise operating each TCU 1403 to report update status to download manager software 113 via the wireless communication link 1422.

The embodiment may comprise utilizing the manager software 103 for: performing a vehicle search; creating and managing a plurality of vehicle groups RG001, . . . , RGyyy; and selecting the target vehicle group RG001 from the plurality of vehicle groups RG001, . . . , RGyyy.

The embodiment may further comprise viewing ECU 1405, 1407, 1409 hardware and software on a per vehicle 1401 basis.

The embodiment may comprise utilizing download manger software 113 to provide update interaction with each the TCU 1403 via wireless communication link 1422.

The embodiment may comprise utilizing each TCU 1403 to report status of the update to the download manager software 113 via the wireless communication link 1422.

The embodiment may comprise providing manager software 103 with an ECU manager 107. The method may comprise utilizing ECU manager 107 to search for predetermined ECUs 1405, 1407, 1409; and utilizing ECU manager 107 to perform one or both of uploading contents of each flash memory 1405b, 1407b, 1409b of the predetermined ECUs 1405, 1407, 1409 or managing flash memory 1405b, 1407b, 1409b contents of the predetermined ECUs 1405, 1407, 1409.

The embodiment may comprise utilizing download manager software 113 to provide update interaction with TCU 1403 via wireless link 1422.

The embodiment may comprise operating TCU 1403 to report status of the update to download manager software 113 via wireless link 1422.

The embodiment may comprise utilizing the manager software 103 for: performing a vehicle search; creating and managing vehicle groups; and viewing ECUs 1405, 1407, 1409 on a per vehicle 1401 basis and current hardware and software versions of each viewed ECU 1405, 1407, 1409.

The embodiment may comprise providing package manager software 109, utilizing package manager 109 to select update prerequisites; utilizing package manager 109 to select update scheduling; and utilizing package manager 109 to select notifications to be generated.

The embodiment may comprise utilizing the manager software 103 to request approval of each DUP from one or more predetermined individuals.

The embodiment may comprise receiving approval of each DUP from one or more predetermined individuals prior to initiating any download of each the DUP.

An embodiment of a method for updating an ECU 1405, 1407, 1409 in a vehicle 1401 may be provided. The ECU 1405, 1407, 1409 comprises flash memory 1405b, 1407b, 1409b storing a digital content image, a random access memory (RAM) which is not shown in the drawing figures, and a boot loader comprises. The method comprises generating a differential update package (DUP) for ECU 1405, 1407, 1409 to update the digital content image to an updated digital content image. The DUP comprises instructions to perform one or more of copying bytes from flash memory 1405b, 1407b, 1409b, applying a set of modifications to the copied bytes, and adding additional bytes. The method further comprises transmitting the DUP over a wireless carrier system 120 to a telematics device or TCU 1403 of the vehicle 1401; storing an original block of the flash memory 1405b, 1407b, 1409b into the RAM; modifying the block in accordance with the DUP to produce a modified block; erasing the original block from the flash memory 1405b, 1407b, 1409b; and writing the modified block into the flash memory 1405b, 1407b, 1409b in place of the block.

The flash memory 1405b, 1407b, 1409b and the RAM are sized to not have the capacity to simultaneously store the present digital content image, the desired digital content image, and the DUP.

The method further comprises generating the DUP by comparing present digital content image of flash memory 1405b, 1407b, 1409b with new desired digital content image of the flash memory and producing a set of changes required to modify the present digital content image to the desired digital content image.

The method may further comprise modifying the boot loader to allow a flashing tool to provide instructions to the boot loader to implement the DUP on the digital content image.

The method may further comprise utilizing the flashing tool to keep track of progression of updating the flash memory 1405b, 1407b, 1409b; utilizing the flashing tool to detect any disruption of the updating progression; and utilizing the flashing tool to initiate continuation of the updating progression from the disruption.

The method may further comprise modifying the boot loader to allow a flashing tool to provide instructions to the boot loader to implement the DUP on the digital content image.

An embodiment of a centralized system 1800 for real-time monitoring widely distributed software updates of vehicle components, comprises: an arbitration server SP000; a distributed network comprising a plurality of communication servers SP001, . . . , SPxxx; and a plurality of vehicles 1401, each vehicle of the plurality of vehicles comprises a TCU 1403N, 1403RG001-001, . . . 1403RGyyy-nnn operable to communicate with one corresponding communication server of the plurality of communication servers SP001, . . . , SPxxx. Each TCU 1403N, 1403RG001-001, . . . 1403RGyyy-nnn is adapted to receive and deploy software updates to ECUs 1405, 1407, 1409 within the corresponding vehicle 1401. Each TCU 1403N, 1403RG001-001, . . . 1403RGyyy-nnn is operable to generate status updates for the software updates and communicate the status updates to its corresponding communication server. Each communication server of the plurality of communication servers SP001, . . . SPxxx is operable to simultaneously receive data messages comprising status updates from its corresponding plurality of vehicles 1401 and to generate a data stream comprising the data messages from the plurality of vehicles 1401, the data stream being sent to a log file.

In the embodiment, the log file is dedicated to a client 101; and arbitration server SP000 receives filtering terms and parameters from client 101 to reduce the data stream to client determined data.

The embodiment may operate such that arbitration server SP000 receives parameters from client 101 to control at least one of formatting and presentation of the data stream.

Still further, arbitration server SP000 communicates the filter terms to selected communication servers of the plurality of communication servers SP001, . . . SPxxx for which the filtering terms apply.

Each communication server SP001, . . . SPxxx may compare each of the data messages to the filtering terms to determine whether each data message matches the filtering terms and to produce a filtered data stream. The filtered data stream is communicated to the arbitration server SP000.

Another embodiment of a centralized system for real-time monitoring widely distributed software updates of vehicle components shown in FIG. 18, comprises a client server 1801, an arbitration server SP000, and a distributed network comprising a plurality of communication servers SP001, . . . , SPxxx. Each communication server SP001, . . . , SPxxx is operable to communicate with a corresponding plurality of vehicle 1401. Each vehicle 1401 comprises apparatus 1403N, 1403RG001-001, . . . 1403RGyyy-nnn operable to communicate with a corresponding communication server of the plurality of communication servers SP001, . . . , Pxxx. The apparatus 1403N, 1403RG001-001, . . . 1403RGyyy-nnn is operable to communicate with electronic control units (ECUs) 1405, 1407, 1409 in each vehicle. Apparatus 1403N, 1403RG001-001, . . . 1403RGyyy-nnn is operable to receive software updates from a corresponding communication server and to selectively deploy the software updates to one or more ECUs 1405, 1407, 1409 within each vehicle 1401. Apparatus 1403N, 1403RG001-001, . . . 1403RGyyy-nnn is operable to monitor status of the software updates and to generate status updates for deployment of the software updates. Apparatus 1403N, 1403RG001-001, . . . 1403RGyyy-nnn is operable to communicate the status updates to the corresponding communication server. Each corresponding communication server SP001, . . . , SPxxx is operable to receive data messages comprising status updates from the corresponding plurality of vehicles 1401 and is operable to utilize the data messages from the corresponding plurality of vehicles 1401 to generate a data stream.

In this embodiment, arbitration server SP000 receives filtering terms from client server 1801 and applies the filtering terms to the data stream to reduce the data stream to client determined data. Arbitration server SP000 may receive formatting parameters from client server 1801 to control formatting of the data stream. Arbitration server SP000 communicates the filter terms to selected communication servers of the plurality of communication servers SP001, . . . SPxxx for which the filtering terms apply. Each communication server SP001, . . . SPxxx applies the filtering terms to each of the data messages to produce a filtered data stream, and the filtered data stream is communicated to arbitration server SP001, . . . SPxxx. Arbitration server SP000 combines all data streams received from the plurality of communication servers SP001, . . . SPxxx for the client to produce a combined data stream, and arbitration server SP000 applies the filtering and the formatting and presentation parameters to the combined data stream to produce a filtered data stream.

An embodiment of a method for real-time widespread distribution of software updates of vehicle components comprising flash memory 1405a, 1407a, 1409a comprises providing a client server 1801 for originating the software updates, providing an arbitration server SP000 operable to communicate with client server 1801, and providing a distributed network 1700 comprising a plurality of communication servers SP001, . . . SPxxx. Each communication server SP001, . . . SPxxx is operable to communicate with apparatus 1403N, 1403RG001-001, . . . 1403RGyyy-nnn in a plurality of corresponding vehicles 1401. The embodiment further comprises operating each apparatus 1403N, 1403RG001-001, . . . 1403RGyyy-nnn to communicate via a wireless network 1521 shown in FIG. 15 with one communication server of the plurality of communication servers SP001, . . . SPxxx to receive and deploy software updates to electronic control units (ECUs) 1405, 1407, 1409 within its corresponding vehicle 1401. The embodiment further comprises operating each apparatus 1403N, 1403RG001-001, . . . 1403RGyyy-nnn to generate status updates for the software updates and to communicate the status updates to the one communication server via the wireless network 1521. The method also comprises operating each communication server of the plurality of communication servers SP001, . . . SPxxx to be operable to concurrently receive the data messages comprising status updates from the plurality of corresponding vehicles 1401. Still further, the method comprises operating each communication server SP001, . . . SPxxx to generate a data stream comprising the data messages from the plurality of corresponding vehicles 1401, the data stream being sent to arbitration server SP000.

An embodiment of a method for real-time monitoring widely distributed software updates of vehicle components, comprises providing a client server 1801, providing an arbitration server SP000, providing a distributed network 1700 comprising a plurality of communication servers SP001, . . . SPxxx, and operating each communication server to communicate with a corresponding plurality of vehicles 1401. Each vehicle 1401 of the corresponding plurality of vehicles comprises apparatus 1403N, 1403RG001-001, . . . 1403RGyyy-nnn operable to communicate with a corresponding communication server of the plurality of communication servers SP001, . . . SPxxx via a wireless network 1521 and operable to communicate with ECUs 1405, 1407, 1409 in each vehicle 1401. The method comprises operating each communication server SP001, . . . SPxxx to download selected software updates for one or more predetermined ECUs 1405, 1407, 1409 in each of the plurality of vehicles 1401 to each vehicle apparatus 1403N, 1403RG001-001, . . . 1403RGyyy-nnn via wireless network 1521, operating each vehicle apparatus 1403N, 1403RG001-001, . . . 1403RGyyy-nnn to selectively deploy the software updates to the one or more predetermined ECUs 1505, 1407, 1409 within the vehicle 1401 to monitor status of the software updates and to generate status updates for deployment of the software updates, and operating each vehicle apparatus 1403N, 1403RG001-001, . . . 1403RGyyy-nnn to communicate the status updates to the corresponding communication server SP001, . . . SPxxx via wireless network 1521. Each corresponding communication server SP001, . . . SPxxx is operable to receive data messages comprising status updates from each vehicle apparatus 1403N, 1403RG001-001, . . . 1403RGyyy-nnn and to utilize the data messages from the corresponding plurality of vehicles 1401 to generate a corresponding data stream.

An embodiment of a method for real-time distribution of software updates of vehicle components comprising flash memory 1405, 1407, 1409 comprises the steps of determining that a vehicle owner has requested a software update for the owner's vehicle; providing a client server 1801 for originating the software update; providing an arbitration server SP000 operable to communicate with the client server 1801; providing a distributed network 1700 comprising a plurality of communication servers SP001, . . . SPxxx, each of the communication servers SP001, . . . SPxxx operable to communicate with apparatus 1403N, 1403RG001-001, . . . 1403RGyyy-nnn in a plurality of corresponding vehicles 1401 via a wireless network 1521. The method further comprises operating each apparatus 1403N, 1403RG001-001, . . . 1403RGyyy-nnn in the owner's vehicle 1401 to communicate with one communication server of the plurality of communication servers SP001, . . . SPxxx via wireless network 1521 to receive and deploy the software updates to an ECU 1405 within the owner's vehicle 1401; operating the apparatus 1403N, 1403RG001-001, . . . 1403RGyyy-nnn in the owner's vehicle to generate status updates for the software update and to communicate the status update to the one communication server SP001, . . . SPxxx via wireless network 1521; operating each communication server of the plurality of communication servers SP001, . . . SPxxx operable to concurrently receive data messages comprising status updates from the plurality of corresponding vehicles 1401 via wireless network 1521; and operating each communication server SP001, . . . SPxxx to generate a data stream comprising the data messages from the plurality of corresponding vehicles 1401 and the status update from the owner's vehicle 1401. The data stream is sent to the arbitration server SP000.

An embodiment of a method for real-time monitoring widely distributed software updates of vehicle components comprises providing a distributed network 1700 comprising a plurality of communication servers SP001, . . . SPxxx; and operating each communication server SP001, . . . SPxxx to communicate with a corresponding plurality of vehicles 1401. Each vehicle comprises corresponding apparatus 1403N, 1403RG001-001, . . . 1403RGyyy-nnn operable to communicate with a corresponding communication server of the plurality of communication servers SP001, . . . , SPxxx over a wireless network 1521. Apparatus 1403N, 1403RG001-001, . . . 1403RGyyy-nnn is operable to communicate with ECUs 1405, 1407, 1409 in each vehicle 1401. The method further comprise initiating a software update to apparatus 1403 in a predetermined one vehicle 1401 of the plurality of vehicles; operating one communication server of the plurality of communication servers SP001, . . . , SPxxx to download selected software updates for a predetermined one or more ECUs 1405, 1407, 1409 in the predetermined one vehicle 1401; and operating each predetermined one vehicle apparatus 1403 to selectively deploy the software updates to one or more predetermined ECUs 1405, 1407, 1409 within the predetermined one vehicle 1401, to monitor status of the software updates and to generate status updates for deployment of the software updates; and operating apparatus 1403 to communicate the status updates to the corresponding communication server of the plurality of communication servers SP001, . . . , SPxxx. The corresponding communication server is operable to receive data messages comprising the status updates from the predetermined one vehicle apparatus 1403 and to utilize the data messages to generate a corresponding data stream.

An embodiment of a TCU 1403 installable in a vehicle 1401 comprises a wireless network interface 1403c; an interface 1403d to a vehicle bus 1411 coupled to a plurality of ECUs 1405, 1407, 1409 disposed in vehicle 1401, a memory 1403b; a processor 1403a; and a differential update package (DUP) received via wireless network interface 1403c and stored in memory 1403b to provide an update to a specific one ECU of the ECUs. Each ECU 1405, 1407, 1409 comprises flash memory 1405b, 1407b, 1409b, a random access memory that is not shown, and a boot loader that is also not shown. The DUP comprises a flashing tool, differential update instructions for the specific one ECU and differential update data for the flash memory 1405b, 1407b, 1409b of the specific one ECU 1405, 1407, 1409. Processor 1403a utilizes the flashing tool to provide the differential update instructions to the boot loader of the specific one ECU 1405, 1407, 1409. The differential update instructions cause are executable by the specific one ECU 1405, 1407, 1409 to store a block of the flash memory contents into the RAM; processor 1403a is operable to provide the differential update data to the specific one ECU 1405, 1407, 1409; the differential update instructions are executable by the specific one ECU 1405, 1407, 1409 to modify the block in accordance with the differential update data to produce a modified block; the differential update instructions are executable by the specific one ECU 1405, 1407, 1409 to erase the block from the flash memory 1405b, 1407b, 1409b; and the differential update instructions are executable by the specific one ECU 1405, 1407, 1409 to write the modified block from the RAM into flash memory 1405b, 1407b, 1409b in place of the erased block.

Processor 1403a utilizes the flashing tool to keep a progression state of the update to flash memory 1405b, 1407b, 1409b. Processor 1403a utilizes the progression state to detect any disruption of the update. Processor 1403a utilizes the flashing tool to initiate continuation of the update subsequent to the disruption.

Wireless network interface 1403c may comprise an interface to a wireless wide area network 1521 and an interface to a wireless local area network.

Each TCU 1403 may comprise a communications agent to automatically select one of the wireless wide area network interface and the wireless local area network interface over which to receive the DUP.

Each TCU 1403 may comprise a communications agent responsive to an attempt to download the DUP over one of the wireless wide area network interface and the wireless local area network interface to automatically enable downloading the DUP to the TCU 1403.

Another embodiment of a TCU 1403 installable in a vehicle 1401 comprises: a wireless network interface 1403c; an interface 1403d to a vehicle bus 1411 coupled to a plurality of electronic control units (ECUs) 1405, 1407, 1409 disposed in vehicle 1401, a memory 1403b; a processor 1403a; and a differential update package (DUP) received via wireless network interface 1403c and stored in memory 1403b to provide an update to a specific one ECU 1405, 1407, 1409. Each ECU 1405, 1407, 1409 comprising flash memory 1405b, 1407b, 1409b, a random access memory (RAM), and a boot loader the DUP comprises a flashing tool, differential update instructions for the specific one ECU 1405, 1407, 1409 and differential update data for flash memory 1405b, 1407b, 1409b of the specific one ECU 1405, 1407, 1409. Processor 1403a is operable to determine if vehicle 1401 is in a predetermined state and processor 1403a is operable to update ECU 1405, 1407, 1409 if vehicle 1401 is in the predetermined state.

Processor 1403a is operable to monitor ECU 1405, 1407, 1409 and the state of vehicle 1401 and to execute the update only while ECU 1405, 1407, 1409 is in a predetermined ECU state and vehicle 1401 is in the predetermined state.

Processor 1403a utilizes the flashing tool to provide the differential update instructions to the boot loader of the specific one ECU 1405, 1407, 1409. The differential update instructions are executable by the specific one ECU 1405, 1407, 1409 to store a block of the flash memory into the RAM. Processor 1403a is operable to provide the differential update data to the specific one ECU 1405, 1407, 1409. The differential update instructions are executable by the specific one ECU 1405, 1407, 1409 to modify the block in accordance with the differential update data to produce a modified block. The differential update instructions are executable by the specific one ECU 1405, 1407, 1409 to erase the block from the flash memory 1405b, 1407b, 1409b and the differential update instructions are executable by the specific one ECU 1405, 1407, 1409 to write the modified block from the RAM into flash memory 1405b, 1407b, 1409b in place of the erased block.

Processor 1403a is operable to monitor each ECU 1405, 1407, 1409 and the vehicle state and to execute the update only while the specific one ECU 1405, 1407, 1409 is in a predetermined ECU state and vehicle 1401 is in the predetermined state and the updates can be completed in a predetermined period of time.

In an embodiment, processor 1403a utilizes the flashing tool to provide differential update instructions to the boot loader of the specific one ECU 1405, 1407, 1409. The differential update instructions are executable by the specific one ECU 1405, 1407, 1409 to store a block of flash memory 1405b, 1407b, 1409b into the RAM. Processor 1403a is operable to provide differential update data to the specific one ECU 1405, 1407, 1409. The differential update instructions are executable by the specific one ECU 1405, 1407, 1409 to modify the block in accordance with the differential update data to produce a modified block. The differential update instructions are executable by the specific one ECU 1405, 1407, 1409 to erase the block from flash memory 1405b, 1407b, 1409b and the differential update instructions are executable by the specific one ECU 1405, 1407, 1409 to write the modified block from the RAM into the flash memory 1405b, 1407b, 1409b in place of the erased block.

In an embodiment, processor 1403a utilizes the flashing tool to keep a progression state of the update to the flash memory 1405b, 1407b, 1409b. Processor 1403a utilizes the progression state to detect any disruption of the update. Processor 1403a utilizes the flashing tool to initiate continuation of the update subsequent to the disruption.

In an embodiment, wireless network interface(s) 1403c comprises an interface to a wireless wide area network 1521. Wireless network interface(s) 1403c may additionally comprises an interface to a wireless local area network. TCU 1403 may further comprise a communications agent to automatically select one of the wireless wide area network interface and the wireless local area network interface over which to receive the DUP.

In an embodiment, a communications agent in TCU 1403 is responsive to an attempt to download the DUP over one of the wireless wide area network interface and the wireless local area network interface to automatically enable downloading the DUP to the TCU 1403.

An embodiment of a method for upgrading vehicle ECUs 1405, 1407, 1409 each comprising a flash memory 1405b, 1407b, 1409b and disposed in a vehicle 1401 comprising a TCU 1403 that is operable to communicate to the ECUs 1405, 1407, 1409 is provided. The method comprises creating a differential upgrade package (DUP) for each upgrade to a predetermined ECU 1405, 1407, 1409. The creating comprises: comparing a new image of the digital contents of the predetermined ECU flash memory with a present image of the digital contents of the predetermined ECU flash memory; and producing a set of changes to modify the present image to the new image, the changes comprising a set of instructions. The set of instructions comprises an instruction to copy a block of bytes from the predetermined ECU flash memory, an instruction perform one or more of applying a set of modifications to the block of bytes and adding additional bytes to the block of bytes to generate a block of the new image, and an instruction to copy the block of the new image into the predetermined ECU flash memory in place of the copied block of bytes from the predetermined ECU flash memory. The method further comprises downloading the DUP to one or more vehicles comprising a TCU via a wireless network and utilizing the TCU to automatically respond to receipt of the DUP to the predetermined ECU to update the predetermined ECU flash memory.

In an embodiment, the method comprises utilizing a distributed network 1700 to download the DUP to a plurality of vehicles 1401 to provide concurrent updating of the predetermined ECU in each plurality of vehicles.

In an embodiment, the method comprises providing a client server 1801; uploading the DUP to the client server 1801; and coupling the client server 1801 to a distributed network 1700 to download the DUP to a plurality of vehicle TCUs 1403N, 1403RG001-001, . . . 1403RGyyy-nnn, each corresponding vehicle comprising the predetermined ECU.

An embodiment of the method further comprises utilizing an arbitration server SP000 coupled to a plurality of communication servers SP001, . . . , SPxxx for the distributed network 1700.

The method may further comprise providing a distributed network 1700 comprising an arbitration server SP000 and a plurality of communication servers SP001, . . . , SPxxx; uploading the DUP to the communication servers SP001, . . . SPxxx via the arbitration server SP000; and downloading the DUP concurrently from the plurality of communication servers SP001, . . . , SPxxx to a plurality of vehicle TCUs 1403N, 1403RG001-001, . . . 1403RGyyy-nnn.

A further embodiment of a method is provided for real-time monitoring of widely distributed software updates of vehicle ECUs 1405, 1407, 1409. Each ECU 1405, 1407, 1409 comprises a flash memory 1405b, 1407b, 1409b and is disposed in one vehicle 1401 of a plurality of vehicles. Each vehicle 1401 comprises a TCU 1403 that is operable to communicate to its corresponding ECUs 1405, 1407, 1409. The method comprises creating a digital upgrade package (DUP) for each upgrade to a predetermined ECU in each vehicle of the plurality of vehicles. The creating comprises: comparing a new image of the digital contents of a predetermined ECU flash memory with a present image of the digital contents of the predetermined ECU flash memory; and producing a set of changes to modify the present image to the new image, the changes comprising a set of instructions. The set of instructions comprises an instruction to copy a block of bytes from the predetermined ECU flash memory, an instruction perform one or more of applying a set of modifications to the block of bytes and adding additional bytes to the block of bytes to generate a block of the new image, and an instruction to copy the block of the new image into the predetermined ECU flash memory in place of the copied block of bytes from the predetermined ECU flash memory. The method further comprises downloading the DUP to the plurality of vehicles via a wireless distributed network 1700; utilizing each TCU 1430 to automatically respond to receipt of the DUP to update a corresponding the predetermined ECU flash memory 1405b, 1407b, 1409b; utilizing each TCU 1430 to automatically generate an update status report for the DUP update of the corresponding predetermined ECU flash memory; and operating each TCU 1430 to automatically upload the status report to the wireless distributed network 1700.

An embodiment may comprise: providing the wireless distributed network 1700 with a plurality of communication servers SP001, . . . , SPxxx, each of the communication servers SP001, . . . , SPxxx operable to communicate with a corresponding subset of the plurality of vehicles 1401; and providing the wireless distributed network 1700 with an arbitration server SP000 operable to communicate with the plurality of communication servers SPS001, . . . , SPxxx.

An embodiment may comprise operating each communication server of the plurality of communication servers SPoo1, . . . , SPxxx to receive the update status report from each vehicle 1401 of the corresponding subset of the plurality of vehicles; and operating each communication server SP001, . . . , SPxxx of the plurality of communication servers SP001, . . . , Spxxx to combine the update status reports into a corresponding data stream.

An embodiment may comprise providing each communication server of the plurality of communication servers SP001, . . . , SPxxx with data stream filtering criteria to filter the update status reports to produce a filtered data stream.

An embodiment may comprise uploading the data stream filtering criteria to the arbitration server SP000 from a client and may further comprise providing each communication server of the plurality of communication servers SP001, . . . , SPxxx with formatting data to format the filtered data stream.

An embodiment may yet further comprise uploading the data stream filtering criteria to the arbitration server SP000 from a client.

An embodiment may comprise providing the arbitration server SP000 with data stream filtering criteria to filter the update status reports to produce a filtered data stream; establishing communication links with selected communication servers SP001, . . . , SPxxx of the plurality of communication servers SP001, . . . , SPxxx for which the data stream filtering is applicable; uploading the data stream filtering criteria to the selected communication servers; and utilizing the data stream filtering criteria at each of the selected communication servers SP001, . . . , SPxxx to filter the update status reports to generate a corresponding data stream for each of the selected communication servers SP001, . . . , SPxxx.

An embodiment may further comprise downloading each corresponding data stream to the arbitration server SP000; and operating arbitration server SP000 to combine all of the corresponding filtered data streams into a single data stream; and downloading the single data stream to the client.

An embodiment may comprise providing the arbitration server SP000 with formatting criteria; and utilizing arbitration server SP000 to apply the formatting criteria to the single data stream to provide a formatted data stream.

An embodiment may comprise downloading the formatted data stream to the client.

An embodiment is provided for a method for real-time monitoring of widely distributed software updates of vehicle ECUs 1405, 1407, 1409 each comprising a flash memory 1405*b*, 1407*b*, 1409*b*. Each ECU 1405, 1407, 1409 is disposed in one vehicle 1401 of a plurality of vehicles, each vehicle 1401 comprising a TCU 1403 that is operable to communicate to the ECUs 1405, 1407, 1409. The method comprises creating a digital upgrade package (DUP) for each upgrade to a predetermined ECU 1405, 1407, 1409 in each vehicle 1401 of the plurality of vehicles; downloading the DUP to the plurality of vehicles via a wireless distributed network 1700; utilizing each TCU 1403 to automatically respond to receipt of the DUP to update a corresponding the predetermined flash memory 1405, 1407, 1409; utilizing each TCU 1403 to automatically generate an update status report for each DUP update of the corresponding the predetermined flash memory !$05*b*, 1407*b*, 1409*b*; and operating each TCU 1403 to automatically upload the status report to the wireless distributed network 1700.

An embodiment may comprise providing the wireless distributed network 1700 with a plurality of communication servers SP001, . . . , SPxxx, each operable to communicate with a corresponding subset plurality of vehicles of the plurality of vehicles 1403N, 1403RG001-001, . . . 1403RGyyy-nnn; and providing the wireless distributed network 1700 with an arbitration server SP000 operable to communicate with the plurality of communication servers 1403N, 1403RG001-001, . . . 1403RGyyy-nnn.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

What is claimed is:

1. A centralized system for real-time monitoring widely distributed software updates of vehicle components, comprising:
    an arbitration server operable to distribute software updates of vehicle components;
    a distributed network comprising a plurality of communication servers each operable to communicate with said arbitration server to receive said software updates and to download said software updates to a corresponding group of vehicles of a plurality of groups of vehicles and to receive real-time status updates for said software updates downloaded to each said vehicle of said corresponding group of vehicles;
    each said vehicle of said plurality of groups of vehicles comprising a telematics control unit (TCU), each said TCU communicates with a corresponding one communication server of said plurality of communication servers, said TCU receives and deploys said software updates from said corresponding one communication server to electronic control units (ECUs) within said vehicle, and said TCU generates real-time status updates for said software updates and communicates said status updates to said corresponding one communication server; and
    each said communication server of said plurality of communication servers operates to simultaneously receive said data messages comprising said status updates from said corresponding group of said plurality of groups of vehicles and generates a data stream comprising said data messages from said corresponding group of said plurality of groups of vehicles, said data stream being sent to a log file.

2. A centralized system in accordance with claim 1, wherein:
    said log file is dedicated to a client said client sourcing said software updates to said arbitration server; and
    said arbitration server receives filtering terms and parameters from said client to reduce said data stream to client determined data.

3. A centralized system in accordance with claim 2, wherein:
    said arbitration server receives parameters from said client to control at least one of formatting and presentation of said data stream.

4. A centralized system in accordance with claim 3, wherein:
    said arbitration server communicates said filter terms to selected communication servers of said plurality of communication servers for which said filtering terms apply.

5. A centralized system in accordance with claim 4, wherein:
    each said selected communication server compares each of its said data messages to said filtering terms to determine whether each said data message matches said filtering terms and to produce a filtered data stream; and said filtered data stream is communicated to said arbitration server.

6. A centralized system in accordance with claim 5, wherein:
said arbitration server combines all data streams received from said plurality of communication servers for said client to produce a combined data stream; and
said arbitration server applies said filtering and said formatting and presentation parameters to said combined data stream to produce a filtered data stream.

7. A centralized system in accordance with claim 6, wherein:
said arbitration server transmits said filtered data stream to said client.

8. A centralized system in accordance with claim 7, wherein:
said client is operable to receive said filtered data stream and to present data messages in said filtered data stream to a user of said client.

9. A centralized system for real-time monitoring widely distributed software updates of vehicle components, comprising:
a client server operable to provide software updates;
an arbitration server in communication with said client server to distribute said software updates;
a distributed network comprising a plurality of communication servers, each said communication server communicates with said arbitration server to receive said software updates, each said communication server communicates with a corresponding group of vehicles of a plurality of groups of vehicles to distribute said software updates to each of said vehicles in said corresponding group of vehicles;
each vehicle of said corresponding group of vehicles comprising:
apparatus operable to communicate with a corresponding communication server of said plurality of communication servers,
said apparatus operable to communicate with electronic control units (ECUs) in said each vehicle,
said apparatus operable to receive said software updates from said corresponding communication server and to selectively deploy said software updates to one or more (ECUs) within said vehicle,
said apparatus is operable to monitor status of said software updates in real-time and to generate real-time status updates for deployment of said software updates, and
said apparatus is operable to communicate said status updates to said corresponding communication server;
each said corresponding communication server is operable to receive data messages comprising said status updates from said corresponding group of vehicles and to utilize said data messages from said corresponding group of vehicles to generate a data stream and to communicate said data stream to said arbitration server, said arbitration server utilizing said data stream to provide software update status data to said client server.

10. A centralized system in accordance with claim 9, wherein:
said arbitration server receives filtering terms from said client server and said arbitration server applies said filtering terms to said data stream to reduce said data stream to client determined data.

11. A centralized system in accordance with claim 10, wherein:
said arbitration server receives formatting parameters from said client server to control formatting of said data stream.

12. A centralized system in accordance with claim 11, wherein:
said arbitration server communicates said filter terms to selected communication servers of said plurality of communication servers for which said filtering terms apply.

13. A centralized system in accordance with claim 12, wherein:
each said communication server applies said filtering terms to each of said data messages to produce a filtered data stream; and
said filtered data stream is communicated to said arbitration server.

14. A centralized system in accordance with claim 13, wherein:
said arbitration server combines all data streams received from said plurality of communication servers for said client to produce a combined data stream; and
said arbitration server applies said filtering and said formatting and presentation parameters to said combined data stream to produce a filtered data stream.

15. A centralized system in accordance with claim 14, wherein:
said arbitration server transmits said filtered data stream to said client server.

16. A centralized system in accordance with claim 15, wherein:
said client server is operable to receive said filtered data stream and to said present data messages in said filtered data stream to a user of said client server.

* * * * *